(12) United States Patent
Li et al.

(10) Patent No.: US 12,073,306 B2
(45) Date of Patent: Aug. 27, 2024

(54) SYSTEMS AND METHODS FOR COMPRESSION AND ACCELERATION OF CONVOLUTIONAL NEURAL NETWORKS

(71) Applicant: The George Washington University, Washington, DC (US)

(72) Inventors: Jiajun Li, Arlington, VA (US); Ahmed Louri, Vienna, VA (US)

(73) Assignee: THE GEORGE WASHINGTON UNIVERSITY, Washington, DC (US)

( * ) Notice: Subject to any disclaimer, the term of this patent is extended or adjusted under 35 U.S.C. 154(b) by 265 days.

(21) Appl. No.: 17/551,967

(22) Filed: Dec. 15, 2021

(65) Prior Publication Data
US 2022/0188600 A1    Jun. 16, 2022

Related U.S. Application Data

(60) Provisional application No. 63/125,804, filed on Dec. 15, 2020.

(51) Int. Cl.
*G06F 17/10* (2006.01)
*G06F 7/544* (2006.01)
*G06N 3/045* (2023.01)
*G06N 3/063* (2023.01)

(52) U.S. Cl.
CPC .......... *G06N 3/045* (2023.01); *G06F 7/5443* (2013.01); *G06N 3/063* (2013.01)

(58) Field of Classification Search
CPC ............................... G06F 7/5443; G06F 17/10
USPC ...................................... 704/202, 232, 259
See application file for complete search history.

(56) References Cited

U.S. PATENT DOCUMENTS

2018/0046900 A1    2/2018  Dally et al.
2018/0046906 A1*   2/2018  Dally ................... G06F 7/5443

OTHER PUBLICATIONS

E. Qin, et al., "SIGMA: A Sparse and Irregular GEMM Accelerator with Flexible Interconnects for DNN Training", https://synergy.ece.gatech.edu; Conference: 2020 IEEE International Symposium on High performance Computer Architecture (HPCA); Feb. 2020; 12 pgs.
S. Zhang, et al., "Cambricon-X: An Accelerator for Sparse Neural Networks", Conference: 2016 49th Annual IEEE/ACM International Symposium on Microarchitecture (MICRO), IEEE, Oct. 2016; 12 pgs.
J. Albericio, et al., "Cnvlutin: Ieffectual-Neuron-Free Deep Neural Network Computing", 2016 ACM/IEEE 43rd Annual International Symposium on Computer Architecture (ISCA); IEEE, Jun. 2016, 13 pgs.
A. Parashar, et al., "SCNN: An Accelerator for Compressed-sparse Convolutional Neural Networks", ISCA '17, Association for Computing Machinery; Jun. 24-28, 2017; 14 pgs.
A. Gondimalla, et al., "SparTen: A Sparse Tensor Accelerator for Convolutional Neural Networks", Micro '19, Oct. 12-16, 2019; pp. 151-165.

(Continued)

*Primary Examiner* — George C Monikang
(74) *Attorney, Agent, or Firm* — BLANK ROME LLP

(57) ABSTRACT

Systems and methods are disclosed for a centrosymmetric convolutional neural network (CSCNN), an algorithm/hardware co-design framework for CNN compression and acceleration that mitigates the effects of computational irregularity and effectively exploits computational reuse and sparsity for increased performance and energy efficiency.

16 Claims, 17 Drawing Sheets

(56) References Cited

OTHER PUBLICATIONS

X. Zhou, et al., "Cambricon-S: Addressing Irregularity in Sparse Neural Networks Through A Cooperative Software/Hardware Approach", 2018 51$^{st}$ Annual IEEE/ACM International Symposium on Microarchitecture, IEEE, 2018, pp. 15-28.

* cited by examiner

FIGURE 8

```
(A) // PE array level
    parallel_for k3=[0:K/Tk){
(B)   // PE sub-array level
      parallel_for w2=[0:W/Tw){
        parallel_for h2=[0:H/Th){
          // PE level
          BUFFER wt_buff[C][Tk*R*S/Px][Px]
          BUFFER in_buff[C][Tw*Th/Py][Py]
          BUFFER acc0_buff[Tk][Tw+R-1][Th+S-1]
          BUFFER acc1_buff[Tk][Tw+R-1][Th+S-1]
          BUFFER out_buff[Tk][Tw+R-1][Th+S-1]
          for k1=[0:Tk){
            for c=[0:C){
              for a=[0:Tw*Th/Px){
                in[0:Px-1]=in_buff[c][a][0:Py-1]
                for w=[0:Tk*R*S/Px){
                  wt[0:Py-1]=wt_buff[c][w][0:Px-1]
                  // Multiplier array level
(C)               parallel_for w0=[0:Px){
                    parallel_for a0=[0:Py){
                      k=Kcoord(w,Px);
                      x0=Xcoord0(a,a0,w,w0,R,S);
                      y0=Ycoord0(a,a0,w,w0,R,S);
                      x1=Xcoord1(a,a0,w,w0,R,S);
                      y1=Ycoord1(a,a0,w,w0,R,S);
                      tmp=in[a0]*wt[w0];
(D)                   acc0_buff[k][x0][y0]+=tmp;
                      acc1_buff[k][x1][y1]+=tmp;
                    }}}}
(E)         out_buff[k1][0:Tw+R-1][0:Th+S-1]+=
              acc0_buff[k1][0:Tw+R-1][0:Th+S-1]
             +acc1_buff[k1][0:Tw+R-1][0:Th+S-1];
}}}
```

(a) CSCNN (b) SCNN (c) SparTen

SYSTEMS AND METHODS FOR COMPRESSION AND ACCELERATION OF CONVOLUTIONAL NEURAL NETWORKS

CROSS-REFERENCE TO RELATED APPLICATIONS

This application claims the benefit of U.S. Provisional App. No. 63/125,804, filed Dec. 15, 2020, the entire contents of which are incorporated herein by reference.

STATEMENT REGARDING FEDERALLY FUNDED RESEARCH

This invention was made with government support under Grant Nos. CCF-1702980, CCF-1812495, CCF-1901165, CCF-1703013 and CCF-1936794 from the National Science Foundation. The government has certain rights in the invention.

FIELD OF THE INVENTION

The present invention is directed to the field of convolutional neural networks (CNNs). More specifically, the present invention is directed to a system framework for CNN compression and acceleration that mitigates the effects of computational irregularity and provides better performance and energy efficiency.

BACKGROUND OF THE INVENTION

Convolutional neural networks (CNNs) have achieved unprecedented performance on many machine learning applications, ranging from image classification to text classification, and speech recognition. Performance improvements are generally correlated with increases in both depth and the number of parameters. For example, Microsoft's ResNet can reach up to 152 layers and over 20 million parameters, which improves performance, but also results in excess computation and memory accesses. Numerous customized accelerators for CNNs that can deliver high computational throughput have been proposed in the literature. However, given the current trend towards deeper and larger models for higher accuracy, it remains a significant challenge to efficiently process large-scale CNNs.

Sparsity has emerged as an effective approach to reduce data and computation in CNNs. Researchers have proposed many effective techniques to make CNNs sparse without compromising accuracy. In recent work, weights that are below a small threshold are pruned to zero, followed by a retraining process to preserve the original accuracy. Such weights can be removed because their contributions to the final output is negligible, thereby significantly reducing the amount of data accesses and computation. However, the data and computation reduction does not necessarily translate into performance improvements for existing accelerators. Sparsity often results in computational irregularity, which prevents accelerators from fully realizing their potential in terms of performance and energy improvement. Computational irregularity refers to a computer program for which the amount of computation the program performs is unknown until runtime. Dense accelerators cannot benefit from sparsity due to lack of dedicated support for irregular and sparse models. Sparse accelerators cannot fully leverage the computation reduction for performance improvement, incurring load imbalance and indexing overhead. As reported in prior work, the reduction in execution time is much lower than the reduction in computation.

Pruning Techniques

Weight pruning can be classified into unstructured and structured pruning. Unstructured pruning does not follow a specific geometry or constraint but prunes as many weights as possible. However, unstructured pruning will inevitably cause irregular sparsity, which prevents accelerators from fully leveraging the performance and energy benefits. Structured pruning techniques have been proposed to maintain the computational regularity and accelerate the decoding of sparse matrices, which can be categorized as channel-wise, filter-wise, and shape-wise pruning, a Structured Sparsity Learning (SSL) method, as described by Wen et al. In filter-wise pruning, for example, all of the weights in a filter are pruned or not pruned together. A recent work is a channel-wise pruning technique called CGNet, which provides structured sparsity by pruning contiguous input channels at a predetermined decision point. This kind of constraint enables accelerator to easily exploit computational savings. However, structured pruning exhibits relatively lower pruning rates compared to unstructured pruning. High-cost arithmetic operations and require FFT hardware to reap the benefits of redundant weights. PermDNN transforms sparse filters into permuted diagonal matrices but only for fully-connected layers.

Structured Weight Matrices

Another approach for model compression is to represent networks with structured matrices. Cheng et al. uses circulant matrices to represent the weights of fully-connected layers to save storage space and enable the use of FFT to speed up computation. CirCNN extends this idea by using block-circulant matrices, and applies to convolutional layers for further computation reduction. Since they are based on FFT computations, they both involve high-cost arithmetic operations and require FFT hardware to reap the benefits of redundant weights. PermDNN transforms sparse filters into permuted diagonal matrices but only for fully-connected layers.

Neural Network Accelerators

Although many neural network accelerators have been proposed to optimize computation, memory and data reuse, they cannot benefit from sparsity without dedicated support. To this end, sparse accelerators have been proposed to process sparsity efficiently. Cnvlutin stores sparse activations in a com-pressed format and skips computation cycles for zero-valued activations to improve both performance and energy efficiency. Cambricon-X exploits sparsity by compressing the pruned weights, skipping computation cycles for zero-valued weights. SCNN leverages the sparsity in both weights and activations, exploiting an algorithm-based dataflow that eliminates ineffective computations from both zero-valued weights and activations simultaneously. EIE performs inference on the compressed fully-connected layers and accelerates the resulting sparse matrix-vector multiplication. MASR is a modular accelerator for sparse RNNs. However, irregularity caused by sparsity prevents accelerators from fully leveraging the computation and data reduction.

Regarding the irregularity problem, Mao et al. shows that coarse-grained sparsity is more hardware-friendly and energy-efficient for sparse CNN accelerators. Scalpel customizes DNN pruning for different hardware platforms based on their parallelism. Cambricon-S employs coarse-grained pruning to reduce the irregularity of weights. SparTen employs efficient inner-join and tackles load-imbalance by software/hardware hybrid approach. Stitch-X stitches sparse weights and input activations together for parallel execution. However, due to the intrinsic irregularity, these approaches incur overhead for sparse matrix representation.

Exploiting computational reuse can also reduce CNN computation. Winograd style of convolution factors out multiples in convolution by taking advantage of the predictable filter slide. UCNN exploits weight repetition to reuse CNN sub-computations and to reduce CNN model size. Riera et al. reuses some results of the previous execution instead of computing the entire DNN to reduce computation. This line of research focuses on unstructured computational reuse, which is potentially complementary to our approach.

To avoid the drawbacks of computational irregularity resulting from sparsity, some approaches directly represent the network with structured matrices to reduce weight storage cost. For example, CirCNN represents neural networks using block-circulant matrices. However, CirCNN requires complicated FFT hardware and involves operations on complex numbers that incur much higher cost than operations on real numbers. PermDNN partially addresses the drawbacks of CirCNN but is not applicable for convolutional layers, limiting its performance benefits since convolutional layers dominate the computations in CNNs.

As such, there is a need in the art for a system that mitigates the effects of computational irregularity and provides better performance and energy efficiency in CNNs.

SUMMARY OF THE INVENTION

The present invention comprises a centrosymmetric convolutional neural network (CSCNN), an algorithm/hardware co-design framework for CNN compression and acceleration that mitigates the effects of computational irregularity and effectively exploits computational reuse and sparsity for increased performance and energy efficiency. On the algorithmic side, CSCNN replaces convolutional filters with centrosymmetric matrices to reduce model size. As shown in FIG. 3, every weight (except the center point if the dimension is odd) shares the same value with the weight at its centrosymmetric position (the dual-weight), effectively decreasing the number of weights by nearly 50%. More importantly, centrosymmetric filters can translate the weight reduction to structured computation reduction because the multiplication between an input activation and a weight can be regularly reused for the multiplication between the same activation and the dual-weight. As a result, CSCNN maintains locality and regularity in both computations and data accesses. Moreover, CSCNN employs a retraining process to preserve the original accuracy and can work cooperatively with pruning schemes to further reduce data and computation. Experimental evaluations show that combining centrosymmetric filters with weight pruning schemes leads to an overall reduction in computation by a factor of 2.8× to 7.2× with only a marginal impact on accuracy. For example, the amount of computation in VGG16 is reduced by a factor of 4.3× (not considering zero activations), with less than 0.3% loss in both top-1 and top-5 accuracy.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 shows computer code representing an exemplary complete CSCNN data flow;

DETAILED DESCRIPTION OF THE PREFERRED EMBODIMENTS

Figure 1:
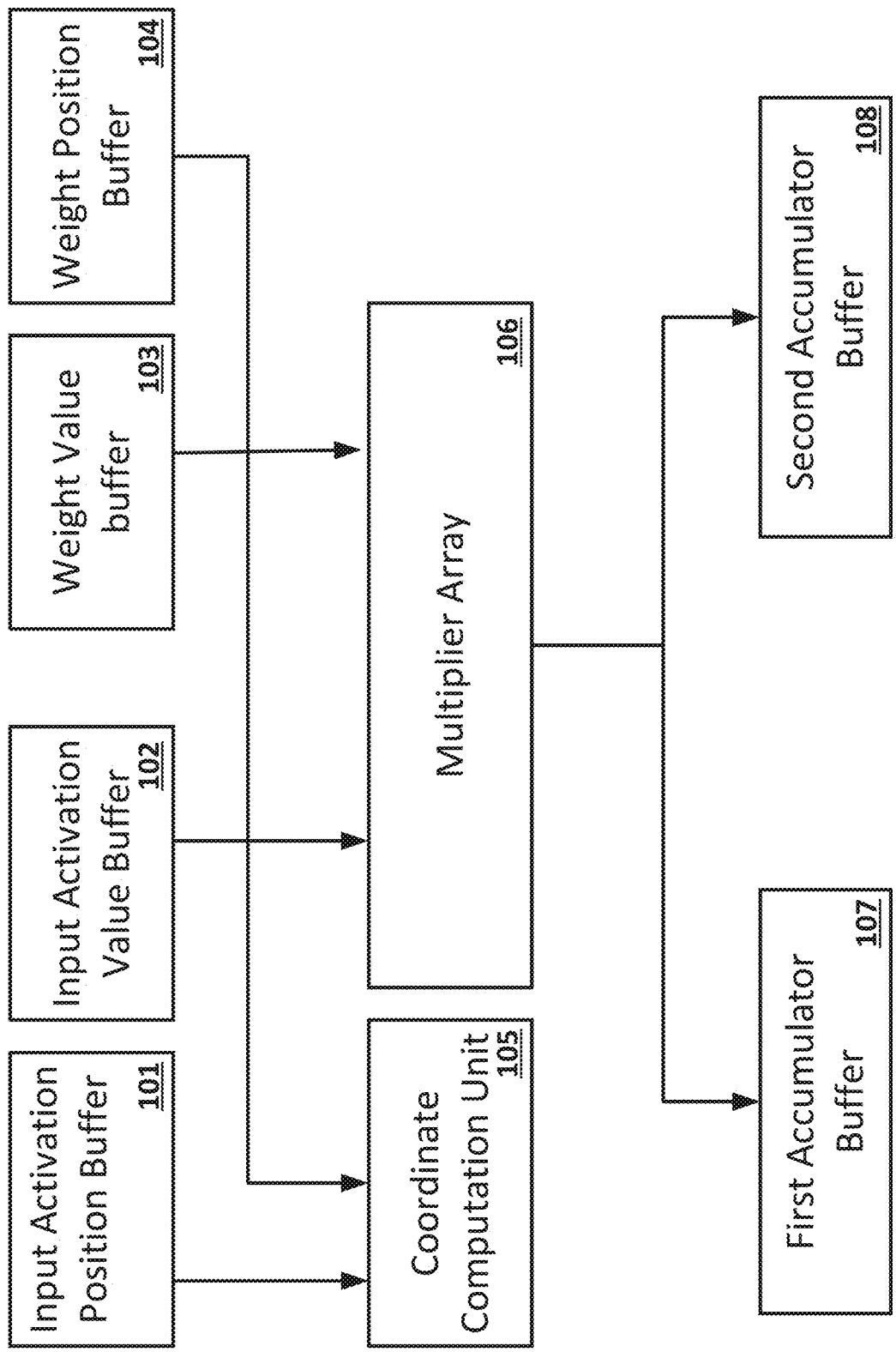
FIG. 1 is a diagram showing exemplary processing element architecture of the present invention that is used to perform computations.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

On the hardware side, we propose a CSCNN accelerator, which exploits structured multiplication reuse and eliminates computations from both zero activations and weights to boost performance and energy efficiency. The multiplication reuse is efficiently exploited by augmenting the Processing Element (PE) in SCNN accelerator with low hardware overhead. The CSCNN PE contains a multiplier array that accepts a vector of non-zero input activations and a vector of non-zero weights to perform Cartesian Product which naturally removes ineffective computations related to zero input activations and weights. Because the multiplication results also contribute to another group of output activations corresponding to the dual-weight, they are immediately reused by delivering them to an additional accumulator buffer. Given that multiply-and-accumulation (MAC) is the major arithmetic operation in CNNs and one multiplication consumes substantially more energy than one addition, the multiplication reuse significantly improves the performance and energy efficiency. The CSCNN accelerator employs a PE array organized into a 2D mesh topology to increase performance and capacity beyond a single PE. The mixed tiling strategy alleviates the impacts of both the inter-PE barrier and intra-PE fragmentation problems.

FIG. 1 is a diagram showing the processing element architecture of the present invention that is used to perform computations. The processing element of the present invention, which may be found in a computer, is comprised of an Input Activation Position Buffer 101, an Input Activation Value Buffer 102, a Weight Value Buffer 103, and a Weight Position Buffer 104. Data collected at the Input Activation Position Buffer 101 and the Weight Position Buffer 104 is transmitted to the Coordinate Computation Unit 105, while data collected at the Input Activation Value Buffer 102 and Weight Value Buffer 103 is transmitted to the Multiplier Array 106. The Multiplier Array 106 accepts a vector of weights from Weight Value Buffer 103 and a vector of input activations from the Input Activation Value Buffer 102. Then the Multiplier Array 106 performs a full Cartesian product of the two vectors and generates Px Py multiplier outputs. The Multiplier Array 106 transmits those outputs to the First Accumulator Buffer 107 and the Second Accumulator Buffer 108.

The system and method of the present disclosure can be implemented by a processing device, referred to here as the control processor 508, of which the Coordinate Computation Unit 105 is a component, to perform various functions and operations in accordance with the disclosure. The processing device can be, for example, a computer, computing device, processor, personal computer (PC), server or mainframe computer. In addition to the processing device, computer hardware may include one or more of a wide variety of components or subsystems including, for example, a co-processor, input devices (keyboard, touchscreen, mouse), monitors, wired or wireless communication links, and a memory or storage device such as a database. The system can be a network configuration or a variety of data communication network environments using software, hardware or a combination of hardware and software to provide the processing functions. Unless indicated otherwise, the process is preferably implemented automatically by the processor substantially in real time without delay or manual action.

All or parts of the system and processes can be implemented at the processing device by software or other machine executable instructions which is stored on or read from computer-readable media for performing the processes described above. Computer readable media may include, for instance, one or more: hard disks, floppy disks, and CD-ROM; a carrier wave received from the Internet; or other forms of computer-readable memory such as read-only memory (ROM) or random-access memory (RAM), solid-state, analog or other memories; optical and/or magnetic media; a centralized or distributed database; and/or caches.

The processes can be implemented in a variety of ways including modules, programs, applications, scripts, processes, threads or code sections that interrelate with each other. The program modules can be commercially available software, discrete electrical components or customized hardwired application specific integrated circuits (ASIC).

Figure 2A:
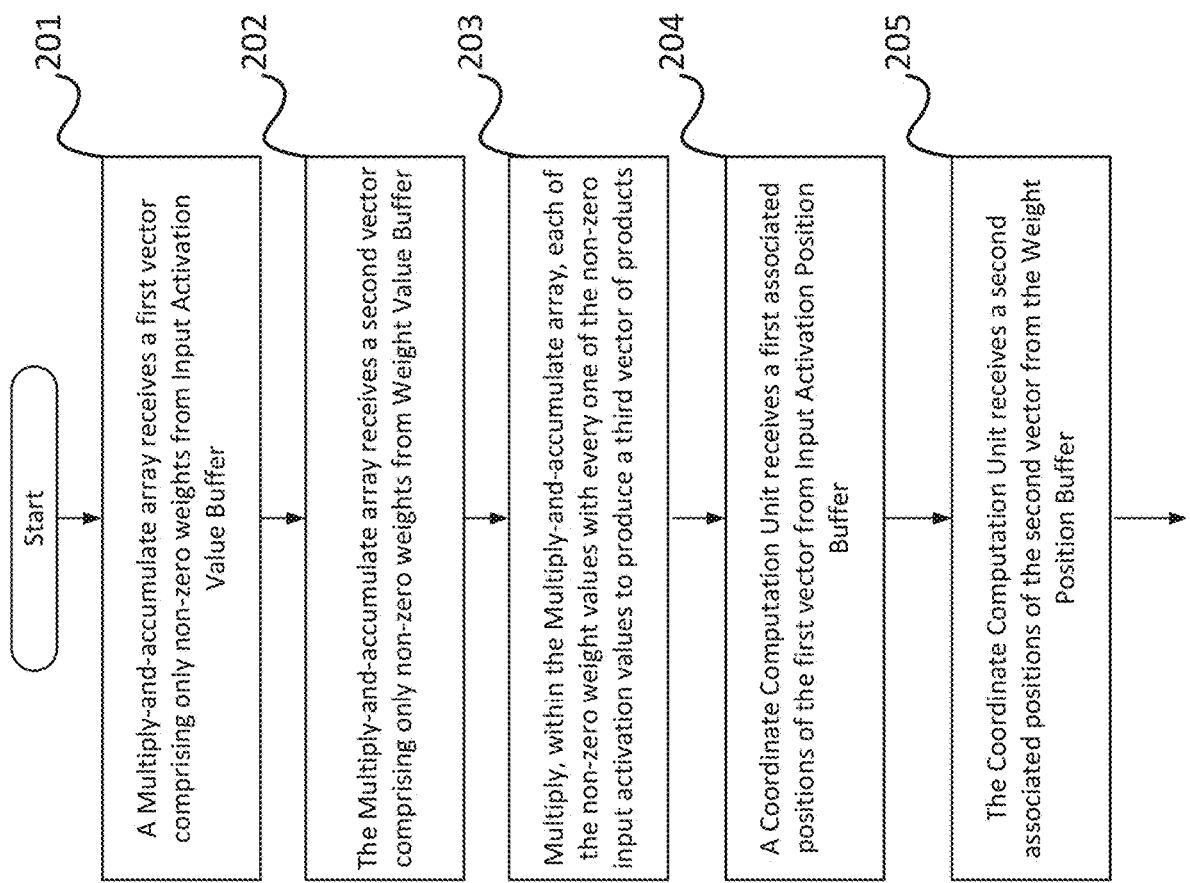
FIG. 2A is a flowchart showing an exemplary method for performing computations using the processing element architecture of the present invention.
Figure 2B:
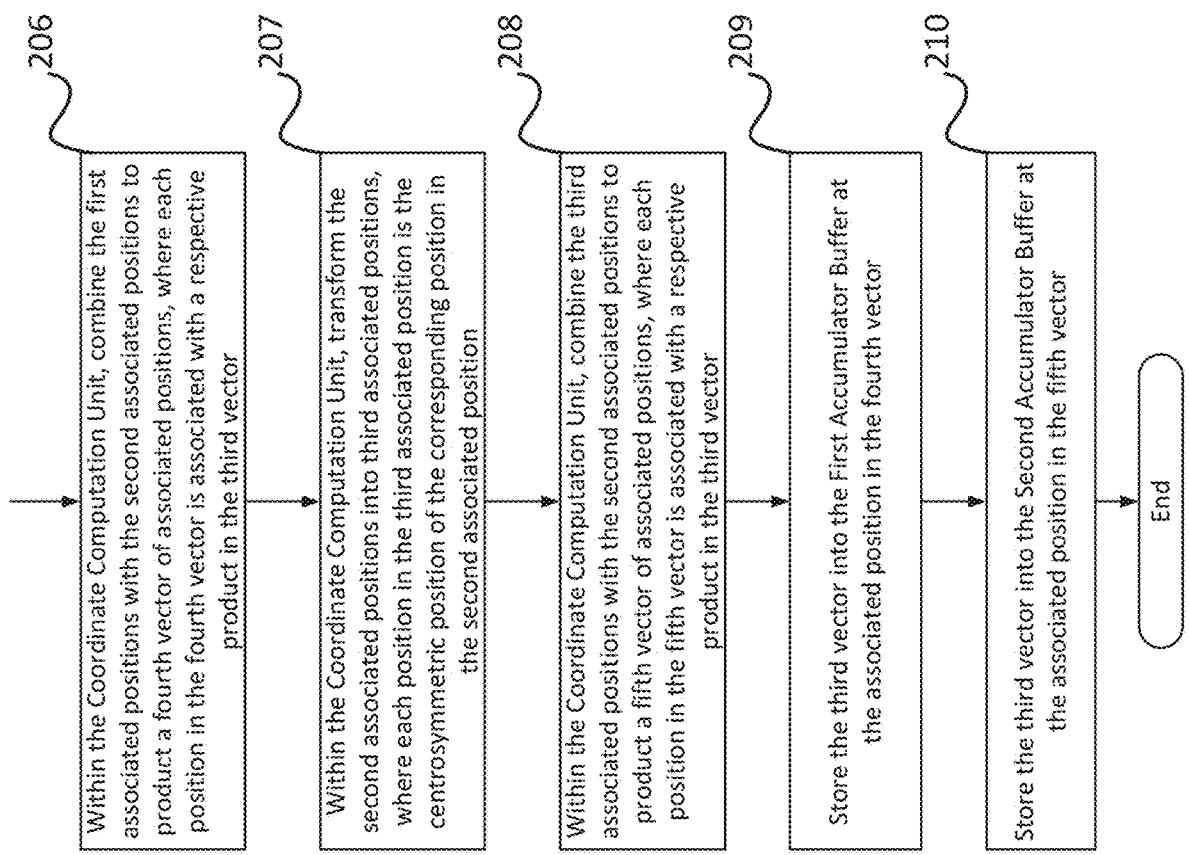
FIG. 2B is a flowchart showing an exemplary method for performing computations using the processing element architecture of the present invention.

FIGS. 2A and 2B are a flowchart showing an exemplary method for performing computations using the processing element architecture of the present invention. The method commences at step 201, where a multiply-and-accumulate array (multiplier array 106) receives a first vector comprising non-zero weights from the Input Activation Buffer 102. At step 202, the multiplier array 106 receives a second vectors comprising non-zero weights from the Weight Value Buffer 103. At step 203, the multiplier array 106 multiplies each of the non-zero weight values with every one of the non-zero input activation values to produce a third vector of products. This third vector of products generated by performing outer product of the first and second vector, as described at step 203. In linear algebra, the outer product of two coordinate vectors is a matrix. If the two vectors have dimensions n and m, then their outer product is an n×m matrix. We flatten this matrix into a vector, i.e., the third vector. At step 204, a Coordinate Computation Unit 105 receives first associated positions of the first vector from the Input Activation Buffer 102. Next, at step 205, the Coordinate Computation Unit 105 receives second associated positions of the second vector from the Weight Position Buffer 104. Using those inputs, at step 206, the Coordinate Computation Unit 105 combines the first associated positions with the second associated positions to calculate a fourth vector of associated positions. The positions in the fourth vector are associated with a respective product in the third vector of products.

At step 207, the Coordinate Computation Unit 105 transforms the second associated positions into third associated positions. The transformation is performed element-wise. The length of the third associated positions is the same as the first associated positions. For each position in the third associated positions, it is the centrosymmetric position in a two-dimensional space of the corresponding position in the first associated positions. For example, in a 3*3 matrix, the centrosymmetric position of (0,0) is (2,2). In a 4*4 matrix, the centrosymmetric position of (0,0) is (3,3). Each position in the third associated position is the centrosymmetric position of the corresponding position in the second associated position. Next, at step 208, the Coordinate Computation Unit 105 combines the third associated position with the second associated positions to calculate a fifth vector of associated positions. The purpose of the combining the third and second associated positions is to obtain the coordinates in the third vector. In one embodiment, the combining comprises performing a vector addition to sum coordinates in the second associated positions with the third associated positions to produce the fifth vector of positions. Each position in the fifth vector of associated positions is associated with a respective product in the third vector.

Then, at step 209, the third vector is stored at the First Accumulator Buffer 107 at the associated position in the fourth vector, and at step 210, the third vector is stored at the Second Accumulator Buffer 108 at the associated position in the fifth vector. The foregoing components and process are explained in greater detail below.

We evaluate the CSCNN accelerator on a set of representative CNN models. We design a cycle-level simulator and an RTL implementation of the CSCNN accelerator. Experimental evaluations show that the CSCNN accelerator achieves speedups of 3.7×, 1.6×, 1.3×, and energy savings by a factor of 2.4×, 1.7×, 1.5×, over a dense accelerator, SCNN, and SparTen, respectively. RTL synthesis results show that the CSCNN up CNN processing.

This application, in relevant detail, discusses:
Centrosymmetric Filters: A novel CNN compression method is disclosed that replaces convolutional filters with centrosymmetric matrices, which significantly reduces data and computation while maintaining computational regularity and accuracy.

Hardware Accelerator: A novel accelerator is disclosed that exploits the computational reuse enabled by centrosymmetric filters and eliminates zero computations, for increased throughput and energy efficiency.

Detailed Evaluation: Evaluation of the proposed accelerator by an RTL prototype and a cycle-level simulator, demonstrating its superior performance and energy efficiency on a wide range of CNN models.

The CSCNN Model

This section presents the CSCNN model, including the training procedure, pruning, and the corresponding computational muse, as well as compression results.

Centrosymmetric Filters

A convolutional layer applies K 3-dimensional (R×S×C) filters to 3-dimensional (W×H×C) input feature maps (IFMaps) to create output feature maps (OFMaps). We denote hereafter W/H as the width/height of IFMaps, R/S as width/height of filters, C/K as number of input/output channels, respectively. Table I lists the notation used in CNNs.

TABLE I

NOTATION FOR CONVOLUTIONAL NEURAL NETWORKS.

| Term | Meaning |
| --- | --- |
| $a_j^{(l)}$ | $j^{th}$ channel of $l^{th}$ layer |
| $W_{ij}^{(l)}$ | $i^{th}$ channel of the $j^{th}$ filter at $l^{th}$ layer |
| $f(\cdot)$ | element-wise non-linear operator |
| * | convolution function |
| J | overall loss junction |
| $\delta_j^l(u, v)$ | $\dfrac{\partial J}{\partial z_j^{(l)}(u, v)}$, backpropagation error |

The convolutional operation can be defined as follows:

$$z_j^{(l)} = \Sigma_i a_i^{(l-1)} * W_{ij}^{(l-1)}, \ a_j^{(l)} = f(z_j^{(l)}) \quad (1)$$

Figure 3:
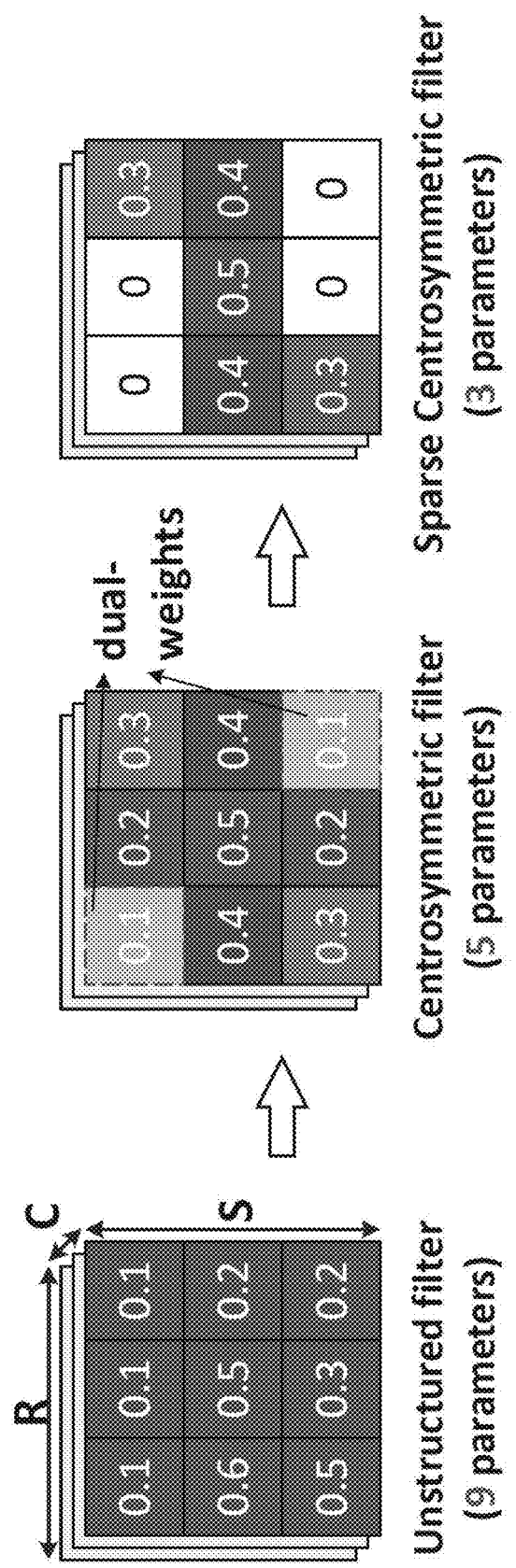
FIG. 3 is a diagram of an exemplary embodiment of the centrosymmetric matrix for convolutional filter representation.

In CSCNN models, the filters are centrosymmetric across the R×S dimension. As shown in FIG. 3, every weight shares the same value with the weight at its centrosymmetric position in each R×S filter slice. More precisely, every convolution kernel satisfies:

$$W_{ij}^{(l)}(u, v) = W_{ij}^{(l)}(R-1-u, S-1-v) \ \forall 0 \le u \le R-1, 0 \le v \le S-1. \quad (2)$$

The proposed hardware accelerator requires moderate area overhead (17.7%) when compared with the SCNN accelerator, demonstrating that data and computation reduction can be efficiently leveraged to speed $\forall 0 \le u \le R-1, 0 \le v \le S-1$.

We refer to the weights located in centrosymmetric positions as dual-weights. Because of the centrosymmetric structure, the filters can be easily compressed by about 2× as we only need to record a single value for the dual-weights. Moreover, it does not impose indexing overhead.

Besides reducing the weight storage, centrosymmetric filters also enable a significant reduction in computation through computational reuse. Consider dual-weights $W^{(l)}(u, v)$ and $W^{(l)}(R-1-u, S-1-v)$ in an R×S kernel, which convolves an activation map of size W×H with unit stride. For each input activation $a_i^{(l)}(w,h)$, the computations related to the given dual-weights are as follows:

$$z_j^{(l+1)}(w-u, h-v) += a_i^{(l)}(w,h) \times W_{ij}^{(l)}(u,v) \ z_j^{(l+1)}(w+u-R+1, h+v-S+1) += a_i^{(l)}(w,h) \times W_{ij}^{(l)}(R-1-u, S-1-v) \quad (3)$$

Note that we use convolutions in full mode here because the results in other modes (valid or same) can be also obtained by cropping the results in full mode. When evaluated on hardware, the computation in Equation (3) entails reading activations and weights from memory, and performing a MAC operation on the activation-weight pair. It needs six memory inputs (two input activations, two weights, two output activations), two multiplications and two additions. In conventional CNNs, the amount of memory reads can be reduced to five if data reuse is enabled, i.e. one memory read for the input activation can be saved. In CSCNN models, the amount of memory reads can be further reduced to four since the dual-weights share the same value. More importantly, the number of multiplications can be reduced to one because the two multiplications share the same input operands so that the result can be reused. Specifically, the computation in Equation (3) can be optimized as:

$$tmp = a_i^{(l)}(w,h) \times W_{ij}^{(l)}(u,v) \ z_j^{(l+1)}(w-u, h-v) += tmp \ z_j^{(l+1)}(w+u-R+1, h+v-S+1) += tmp \quad (4)$$

Given that MACs dominate the arithmetic operations in CNNs and one multiplication consumes significantly more energy than one addition, e.g. one 32 bit-int-MULT consumes 31× more energy than one 32 bit-int-ADD, the computational reuse can be leveraged to significantly improve the performance and energy efficiency of CNN accelerators. Meanwhile, the multiplication reduction ratio is identical to the weight reduction ratio, revealing that the sparsity created by centrosymmetric filters can be completely translated into performance and energy benefits. The details on how the proposed accelerator supports computational reuse will be explained below. It should be noted that the computational reuse is not applicable for fully-connected layers since an individual weight in such layers is only multiplied by a single input activation. Besides, the computational reuse might not be applicable for convolutions since it does not introduce computational benefits. Fortunately, CSCNN can be combined with prior pruning methods that work well with these layers, e.g., Deep Compression, which will be discussed below.

CSCNN Training

Figure 4:
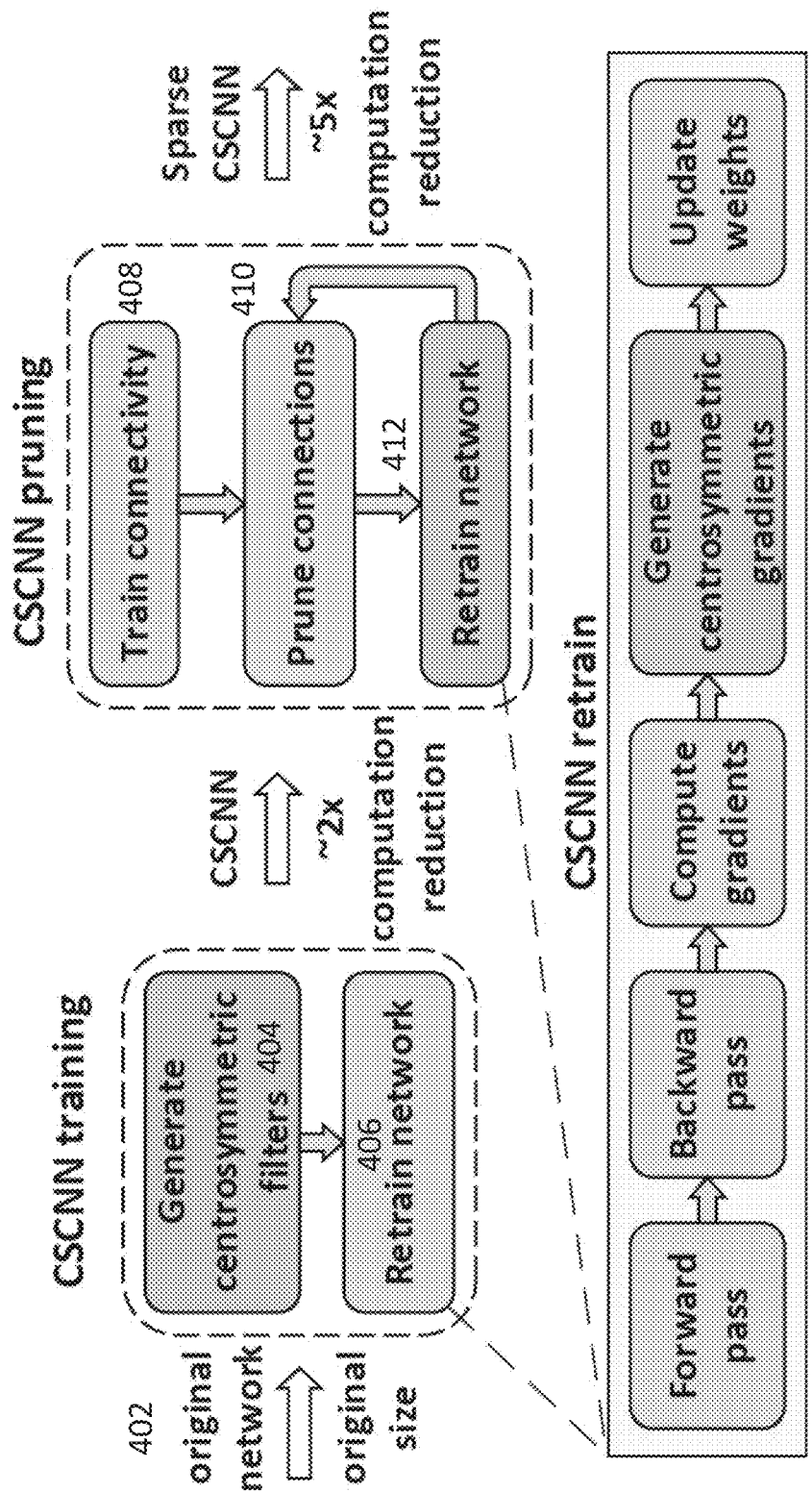
FIG. 4 is a diagram of an exemplary embodiment of a CSCNN training and pruning algorithm.

A two-step process is employed to obtain a CSCNN model from a pre-trained conventional model, as illustrated in FIG. 4, which begins by generating centrosymmetric filters 404 based on original filters 404. We then employ a retraining process 406 to retain the network accuracy. In conventional CNNs, the original values of the dual-weights are usually not identical. There are several ways to initialize centrosymmetric filters, for example, retain the top-left weights and duplicate them to the bottom-right. It is better to initialize the dual-weights using the mean value of their original values before retraining. Specifically, the centrosymmetric filters are generated as follows:

$$\tilde{W}_{ij}^{(l)}(u, v) = \tilde{W}_{ij}^{(l)}(-u, -v) = \frac{W_{ij}^{(l)}(u, v) + W_{ij}^{(l)}(-u, -v)}{2} \quad (5)$$

where $W_{ij}^{(l)}(u, v)$ and $\tilde{W}_{ij}^{(l)}(u, v)$ denote the weights in original and new kernels, respectively. We denote $W_{ij}^{(l)}(-u, -v)$ to represent $W_{ij}^{(l)}(R-1-u, S-1-v)$ hereafter for simplicity.

Unsurprisingly, the accuracy drops drastically after the weight initialization. For example, the accuracy of LeNet-5 drops from 99.2% to 71.6%. Therefore, a retraining process is required to reattain the original accuracy. The gradient of J with respect to weight $W_{ij}^{(l-1)}(u, v)$ is:

$$\frac{\partial J}{\partial W_{ij}^{(l-1)}(u, v)} = \sum_{u'}\sum_{v'} \frac{\partial J}{\partial z_j^{(l)}(u', v')} \cdot \frac{\partial z_j^{(l)}(u', v')}{\partial W_{ij}^{(l-1)}(u, v)} \quad (6)$$

with non-unit stride. For example, in the first layer of AlexNet (stride of 4, filter size of 11×11), an activation may not occur.

Given $\tilde{W}_{ij}^{(l)}(u, v) = \tilde{W}_{ij}(-u, -v)$ because of the centrosymmetric constraint, the gradient with respect to the combined value is simultaneously multiplied with a given pair of dual-weights because the non-unit stride skips one or both dual-weights. Therefore, centrosymmetric filters are not applied to fully-connected layers and convolutional layers with non-unit stride weight is as follows:

$$\frac{\partial J}{\partial \tilde{W}_{ij}^{(l-1)}(u, v)} = \frac{\partial J}{\partial \tilde{W}_{ij}^{(l-1)}(-u, -v)} = \sum_{u'}\sum_{v'} \frac{\partial J}{\partial z_j^{(l)}(u', v')} \cdot \frac{\partial z_j^{(l)}(u', v')}{\partial W_{ij}^{(l-1)}(u, v)} + \sum_{u'}\sum_{v'} \frac{\partial J}{\partial z_j^{(l)}(u', v')} \cdot \frac{\partial z_j^{(l)}(u', v')}{\partial W_{ij}^{(l-1)}(-u, -v)} \quad (7)$$

To implement training, we use the conventional CNN class in PyTorch where the dual-weights are still considered as separate weights, however before each gradient update during training, gradients are set to half the value derived from Equation 7. This gives the gradient a centrosymmetric structure and is theoretically equivalent to using a tied weight for the two dual-weights. This is because updating the tied weight gradient with the sum of the two gradients (as obtained using the chain rule of differentiation) is equivalent to updating it twice with the average sum in our implementation. In future work, we will implement a customized PyTorch class for CSCNN models where each pair of dual-weights are implemented as one tied weight, which will also reduce the amount of memory during training. We use a vectorized implementation (using "flip" function in PyTorch) for the centrosymmetric filters, so the training speed overhead compared with original training is negligible. We use the default training configuration (learning rate, momentum, etc.) in PyTorch for these models. We set the total number of epochs at 30, and the learning rate decays by a factor of 5 every 5 epochs.

CSCNN Pruning

Pruning techniques are complementary to centrosymmetric filters and can be applied to further reduce data and computation. As a case study, we present the procedure of combining CSCNN with the weight pruning technique in Deep Compression. As shown in FIG. 4, the pruning method typically follows three steps: 1) train a normal network 408 to learn the connectivity; 2) gradually prune 410 the weights below a threshold to zeros; and 3) retrain the network 412 to maintain accuracy. The first two steps are similar to conventional pruning, while the third step employs the CSCNN retraining procedure to maintain the centrosymmetric structure. Since the dual-weights will be pruned together or not given that they share the same value, the pruned network will maintain the centrosymmetric structure. The pruning method is applied to all layers including FC layers and convolutional with non-unit stride, which complements the CSCNN method as centrosymmetric filters are not applied in these layers. In our pruning experiments, we apply the same hyper-parameters and fine-tuning techniques as those in Deep compression.

Compression Results

We compare our method with prior art on CNN compression, including unstructured pruning, structured pruning, and other pruning methods customized for hardware]. Table II and Table III list the weight sparsity, multiplication reduction and accuracy of these techniques for Cifar-10 and Imagenet, respectively. For Cifar-10, we evaluate on ConvNet, VGG-16 and WideResNet. For ImageNet, we evaluate on ResNet-18/ResNet-50/ResNet/152, VGG-16, AlexNet, SqueezeNet, ResNeXt101, ShuffleNet-V2, and EfficientNet-B7. The multiplication reduction listed in the tables only considers the effect of reduced weights, not taking the zero activations into account for a fair comparison.

TABLE II

COMPARISON OF ACCURACY AND THE COMPUTATION REDUCTION OF THE COMPRESSION METHODS FOR CIFAR-10.

| Baseline | Models | Top-1 Accu. Baseline (%) | Top-1 Accu. (%) | Top-1 Accu. Drop (%) | Multiplication Reduction[‡] |
|---|---|---|---|---|---|
| ConvNet | Deep compression | 75.8 | 75.7 | 0.1 | 3.8× |
| | CSCNN | 75.8 | 75.8 | 0.0 | 1.7× |
| | CSCNN + Pruning | 75.8 | 75.6 | 0.2 | 5.8× |
| VGG-16 | Deep compression | 92.8 | 92.8 | 0.0 | 5.3× |
| | CGNet | 92.8 | 92.4 | 0.4 | 5.1× |
| | CSCNN | 92.8 | 92.8 | 0.0 | 1.8× |
| | CSCNN + Pruning | 92.8 | 92.5 | 0.3 | 7.2× |
| WideResNet | CSCNN | 95.8 | 95.4 | 0.4 | 1.6× |

[‡]The multiplication reduction only considers the effect of reduced weights, not taking the zero activations into account to provide a fair comparison.

TABLE III

COMPARISON OF ACCURACY AND THE COMPUTATION REDUCTION OF THE COMPRESSION METHODS FOR IMAGENET.

| Baseline | Compression Techniques | Top-1 Accu. Baseline (%) | Top-1 Accu. (%) | Top-1 Accu. Drop (%) | Top-5 Accu. Baseline (%) | Top-5 Accu. (%) | Top-5 Accu. Drop (%) | Multiplication Reduction[†] |
|---|---|---|---|---|---|---|---|---|
| ResNet-18 | Deep compression [30] | 69.2 | 69.0 | 0.2 | 88.8 | 88.5 | 0.3 | 2.0× |
| | Soft Filter Pruning [49] | 70.3 | 67.1 | 3.2 | 89.6 | 87.8 | 1.8 | 1.7× |
| | Network Slimming [50] | 69.0 | 67.2 | 1.8 | 88.7 | 87.4 | 1.3 | 1.4× |
| | Discrimination-aware Pruning [51] | 69.6 | 67.3 | 2.3 | 89.0 | 87.6 | 1.4 | 1.9× |
| | Low-cost Collaborative Layers [52] | 70.0 | 66.3 | 3.7 | 89.2 | 87.0 | 2.2 | 1.5× |
| | Feature Boosting & Suppression [53] | 70.7 | 68.2 | 2.5 | 89.7 | 88.2 | 1.5 | 2.0× |
| | CGNet [31] | 69.0 | 67.4 | 1.6 | 88.8 | 87.8 | 1.0 | 1.6× |
| | CSCNN | 69.2 | 68.6 | 0.6 | 88.8 | 88.1 | 0.7 | 1.7× |
| | CSCNN + Pruning | 69.2 | 68.4 | 0.8 | 88.8 | 87.9 | 0.9 | 2.8× |
| VGG-16 | Deep compression | 68.5 | 68.8 | −0.3 | 88.7 | 89.1 | −0.4 | 3.0× |
| | Cambricon-S [54] | 68.5 | 68.7 | −0.2 | 88.7 | — | — | 2.8× |
| | Network Slimming [50] | 63.3 | 63.3 | 0 | — | — | — | 1.4× |

TABLE III-continued

COMPARISON OF ACCURACY AND THE COMPUTATION REDUCTION OF THE COMPRESSION METHODS FOR IMAGENET.

| Baseline | Compression Techniques | Top-1 Accu. Baseline (%) | Top-1 Accu. (%) | Top-1 Accu. Drop (%) | Top-5 Accu. Baseline (%) | Top-5 Accu. (%) | Top-5 Accu. Drop (%) | Multiplication Reduction[†] |
|---|---|---|---|---|---|---|---|---|
| | Eigendamage [55] | 68.5 | 65.6 | 2.9 | 88.7 | 85.5 | 3.2 | 2.9× |
| | Balanced Sparsity [56] | — | — | — | 90.3 | 90.3 | 0.0 | 3.0× |
| | CSCNN | 68.5 | 68.6 | −0.1 | 88.7 | 88.7 | 0.0 | 1.8× |
| | CSCNN + Pruning | 68.5 | 68.4 | 0.1 | 88.7 | 88.4 | 0.3 | 4.3× |
| AlexNet | Deep compression | 57.2 | 57.2 | 0.0 | 80.3 | 80.3 | 0.0 | 2.2× |
| | Cambricon-S [54] | 57.2 | 57.3 | −0.1 | 80.3 | — | — | 1.9× |
| | CGNet | 57.2 | 42.9 | 14.3 | 80.3 | 80.0 | 0.3 | 2.6× |
| | CirCNN [44] | 57.2 | — | 1~2[‡] | — | — | — | — |
| | Viterbi-based pruning [57] | 57.2 | 57.3 | −0.1 | 80.3 | 80.2 | 0.1 | 2.2× |
| | CSCNN | 57.2 | 57.2 | 0.0 | 80.3 | 80.1 | 0.2 | 1.5× |
| | CSCNN + Pruning | 57.2 | 57.0 | 0.2 | 80.3 | 79.9 | 0.4 | 2.9× |
| SqueezeNet | Deep compression | 57.5 | 57.5 | 0.0 | 80.3 | 80.3 | 0.0 | 4.2× |
| | CSCNN | 57.5 | 57.2 | 0.3 | 80.3 | 80.1 | 0.2 | 1.7× |
| | CSCNN + Pruning | 57.5 | 57.0 | 0.5 | 80.3 | 79.9 | 0.4 | 5.9× |
| ResNeXt-101 | CSCNN | 80.9 | 80.1 | 0.8 | 95.6 | 94.5 | 1.1 | 1.6× |
| ResNet-50 | Deep compression | 75.3 | 74.9 | 0.4 | 92.2 | 91.7 | 0.5 | 2.2× |
| | CSCNN | 75.3 | 75.1 | 0.2 | 92.2 | 92.0 | 0.2 | 1.6× |
| | CSCNN + Pruning | 75.3 | 74.8 | 0.5 | 92.2 | 91.5 | 0.7 | 2.8× |
| ResNet-152 | Deep compression | 77.0 | 76.8 | 0.2 | 93.3 | 93.0 | 0.3 | 2.3× |
| | CSCNN | 77.0 | 76.9 | 0.1 | 93.3 | 93.1 | 0.2 | 1.5× |
| | CSCNN + Pruning | 77.0 | 76.6 | 0.4 | 93.3 | 92.8 | 0.5 | 2.7× |
| ShuffleNet-V2 | Deep compression | 77.2 | 76.7 | 0.5 | 93.3 | 92.6 | 0.7 | 2.2× |
| | CSCNN | 77.2 | 76.9 | 0.3 | 93.3 | 92.7 | 0.6 | 1.8× |
| | CSCNN + Pruning | 77.2 | 76.5 | 0.7 | 93.3 | 92.4 | 0.9 | 3.2× |
| EfficientNet-B7 | Deep compression | 84.3 | 84.0 | 0.3 | 97.0 | 96.8 | 0.2 | 3.1× |
| | CSCNN | 84.3 | 84.1 | 0.2 | 97.0 | 96.8 | 0.2 | 1.7× |
| | CSCNN + Pruning | 84.3 | 83.8 | 0.5 | 97.0 | 96.6 | 0.4 | 4.3× |

[†]The multiplication reduction only considers the effect of reduced weights, not taking the zero activations into account to provide a fair comparison.
[‡]CirCNN does not provide specific accuracy values. The code of CirCNN is also unavailable.

For ResNet18, CSCNN individually offers comparable multi-plication savings with less accuracy drop compared to all the structured pruning techniques. CSCNN with pruning further achieves the highest multiplication reduction (2.8) with less than 1% accuracy loss. CSCNN also offers considerable multiplication reduction for other CNN models with marginal accuracy losses.

Further empirical evidence for the effectiveness of CSCNN is provided by comparisons with other filter parameterization schemes. The first one is using smaller filters with the same number of parameters as centrosymmetric filters. For example, if the original filter size is 3×3, we replace it with 2×2 filters (4 effective parameters), and compare it with centrosymmetric filters in which the central entry is constrained to be zero (also 4 effective parameters). The results show that CSCNN provides better accuracy than the models using smaller filters. For example, we changed the filter size of VGG11/NGG13/NGG16 from 3×3 to 2×2, and observed an accuracy drop of over 4% for all the models. The reason is that a 2×2 filter has a smaller receptive field, which implies that it recognizes features that are constrained to be more local compared with a 3×3 centrosymmetric filter, which can recognize features over a larger size input. Another scheme is using upper/lower triangular matrices as filters, which reduces the same number of parameters as centrosymmetric filters. We found that CSCNN also shows better accuracy than this kind of filter designs.

Even though the experimental results already demonstrate that CSCNN is promising in network compression, we would also like to mention the theoretical foundation of CSCNN. In the theory of neural networks, the universal approximation property states that a neural network should be able to approximate any continuous or measurable function with arbitrary accuracy provided that an enough large number of parameters are available. We have proved that CSCNNs have this property. Detailed proof procedure is omitted because of space limitation.

CSCNN Accelerator

Cartesian-product based architecture to handle the structured multiplication reuse introduced by CSCNN, and supports two-sided (both activations and weights) sparse execution and storage. We further employ a mixed spatial tiling strategy to spread the work across multiple PEs for increased performance, which alleviates the impacts of the inter-PE barrier and intra-PE fragmentation problems incurred by rigid tiling strategies. Then, we introduce the complete dataflow of the accelerator and discuss how it supports FC layers.

Architecture Overview

Figure 5:
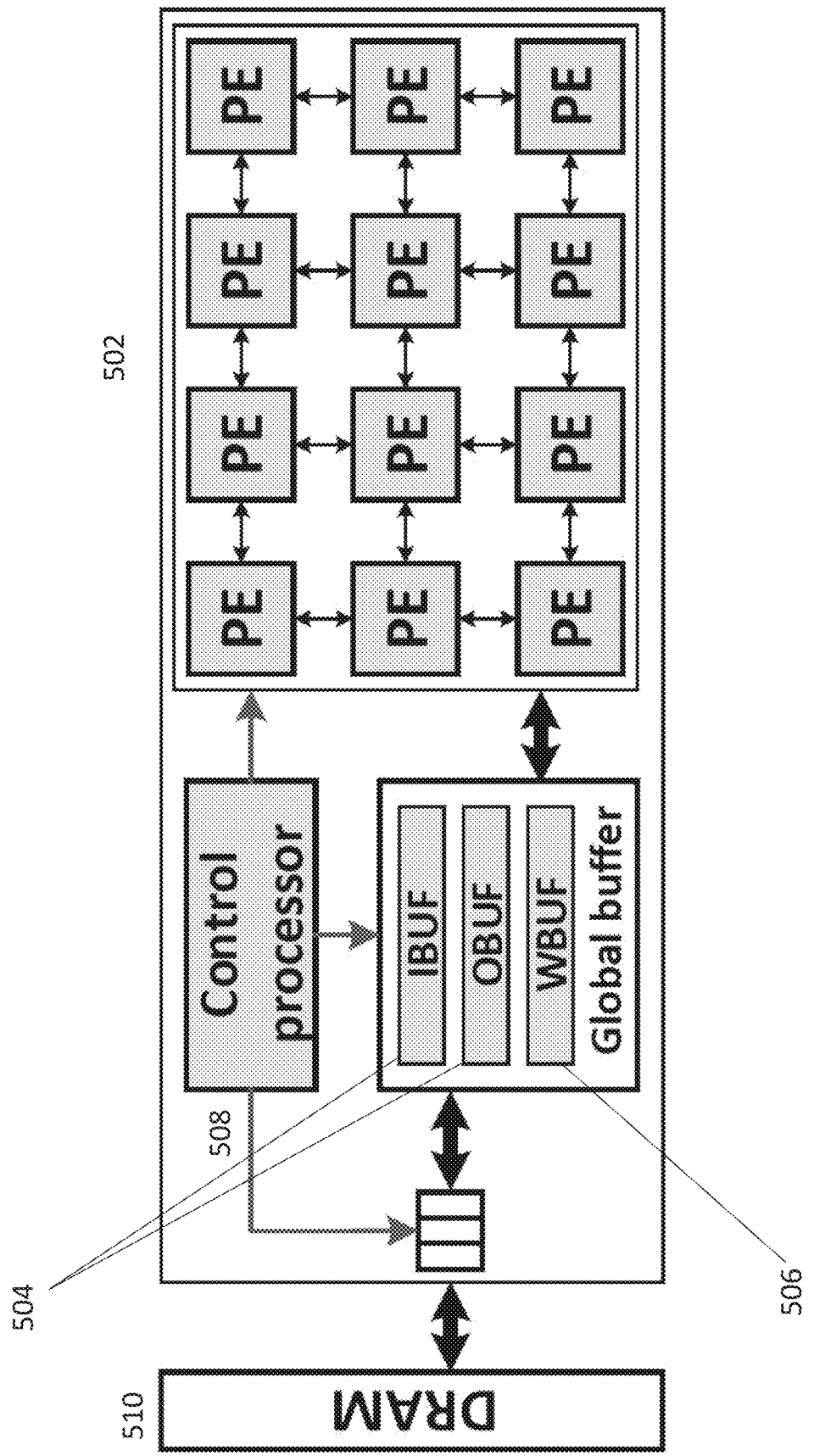
FIG. 5 is a diagram of an exemplary embodiment of a CSCNN accelerator.

FIG. 5 shows the overall architecture of the CSCNN accelerator, which consists of the following main components: a PE array for computation 502, two buffers for input activations and output activations (IBUF and OBUF) 504, a buffer for weights (WBUF) 506, and a control processor (CP) 508. The PE array 502 consists of multiple PEs connected via simple interconnections. The CP 508 controls the data and execution flow of all the modules. The accelerator is connected to off-chip DRAM 510 that stores the input activations and weights of a network model. To accomplish the execution of a convolutional layer, the activations and weights are fetched from off-chip DRAM to on-chip buffers. Each PE receives weights and input activations from dedicated channels and performs convolutions with centrosymmetric filters, which is referred as centrosymmetric convolution hereafter for brevity. The result output activations are stored locally in the buffers of each PE for further accumulation, or transferred to neighbor PEs for halo value exchange. When a layer contains multiple OFMaps and IFMaps, each PE continuously performs the computations of an OFMap, and will not move to the next OFMap until the current map has been constructed. When computations are completed, the output activations of intermediate layers are buffered on-chip if possible to minimize off-chip data transfers.

Processing Element (PE) Architecture

PE architecture is based on the SCNN PE that exploits both activation and weight sparsity to improve performance and energy. Since SCNN PE cannot exploit the structured multiplication reuse, the computation reduction introduced by centrosymmetric filters cannot be translated into practical speedup. Therefore, we augment the SCNN PE to efficiently exploit the multiplication reuse in centrosymmetric convolutions.

Figure 6:
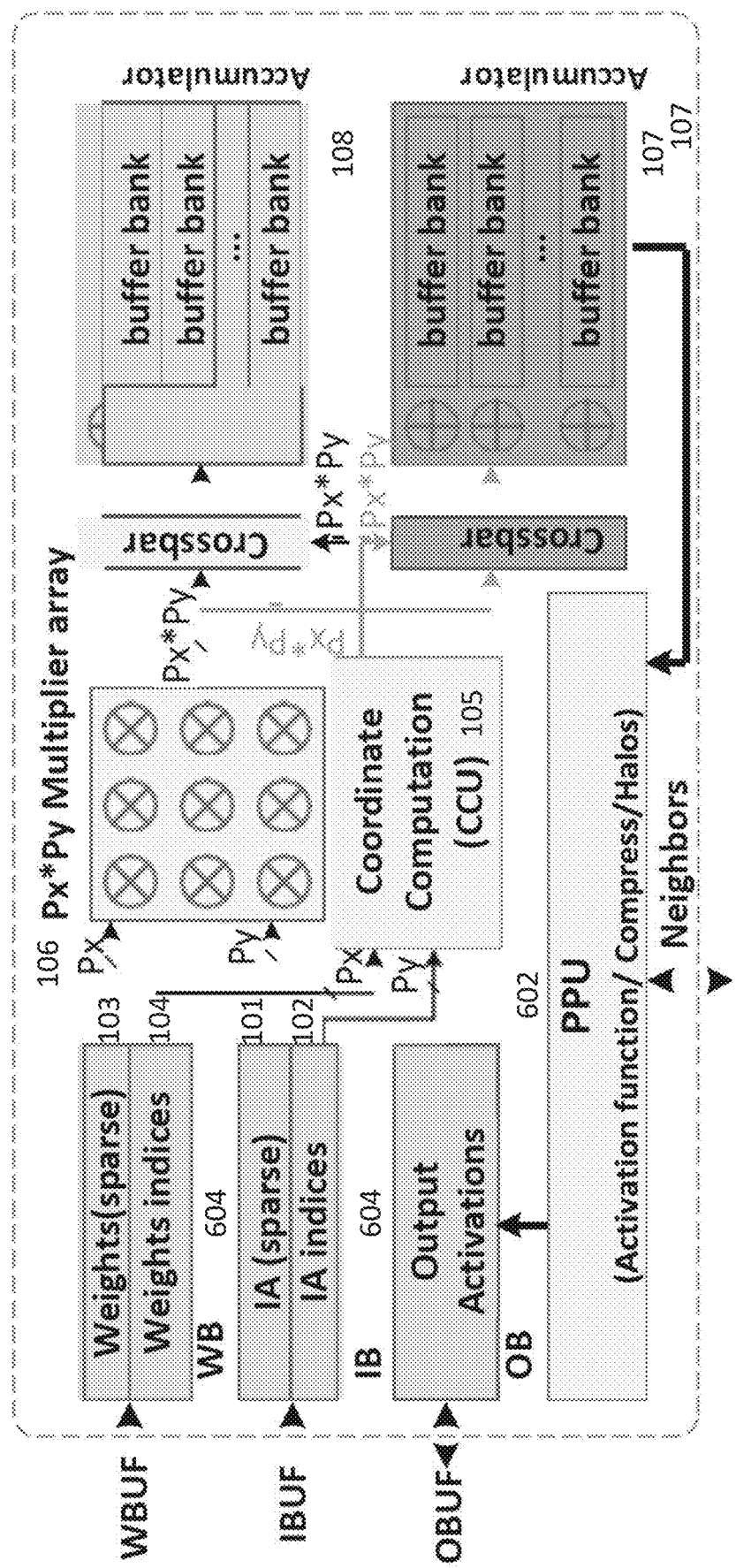
FIG. 6 is a diagram of an exemplary embodiment of CSCNN processing element (PE), more specifically, the processing element architecture for centrosymmetric convolutional neural network computation.

Baseline PE Architecture: FIG. 6 (non-blue modules) shows the CSCNN PE architecture, including a weight buffer (WB) 103,104, input activation buffer 101, 102, and the output 606 activation buffer (IB/OB), a multiplier array 106, an accumulator buffer (AB) 107, 108, a Coordinate Computation Unit (CCU) 105 and a Post Processing Unit (PPU) 602. The workflow of the baseline PE is further illustrated by the example in FIG. 6 (ignoring Accumulator buffer 1). Both weights and input activations are stored in compressed format that records the non-zero values and the number of zeros between adjacent non-zero values.

The multiplier array 106 of size Px Py accepts a vector of Px weights (W00, W01, W20 in FIG. 6A) from WB 103, 104 and a vector of Py input activations (122, 125, 33) from IB 101, 102. Then the multiplier array 106 performs a full Cartesian product of the two vectors and generate Px Py multiplier outputs ($X_{ij}$ in FIG. 7B). At the same time, the CCU 105 computes the coordinates of the multiplier outputs. Then, the multiplier outputs are sent to the AB 107, 108 to update the corresponding partial sums at the matching coordinates (($P_{ij}$, marked blue in OFMap)). Each multiplier output is accumulated with its corresponding partial sum with the same output coordinates. The number of banks in AB0 is 2 $P_xP_y$ to reduce accumulator bank contention. The non-linear activation and/or compression are performed in the PPU 602 if necessary before writing the output activations to the OB 604. Since only non-zero weights and non-zero input activations are delivered to the multiplier array, the baseline PE can exploit both weight and activation sparsity.

CSCNN PE Architecture: The baseline PE cannot leverage computational reuse due to lack of dedicated support. We now describe how to augment it to leverage the performance and energy benefits of CSCNNs. The CSCNN PE retains the basic design and components of the baseline PE along with its dataflow (described below), and only imposes an additional accumulator buffer as shown in FIGS. 6A-6C.

Figures 7A, 7B:
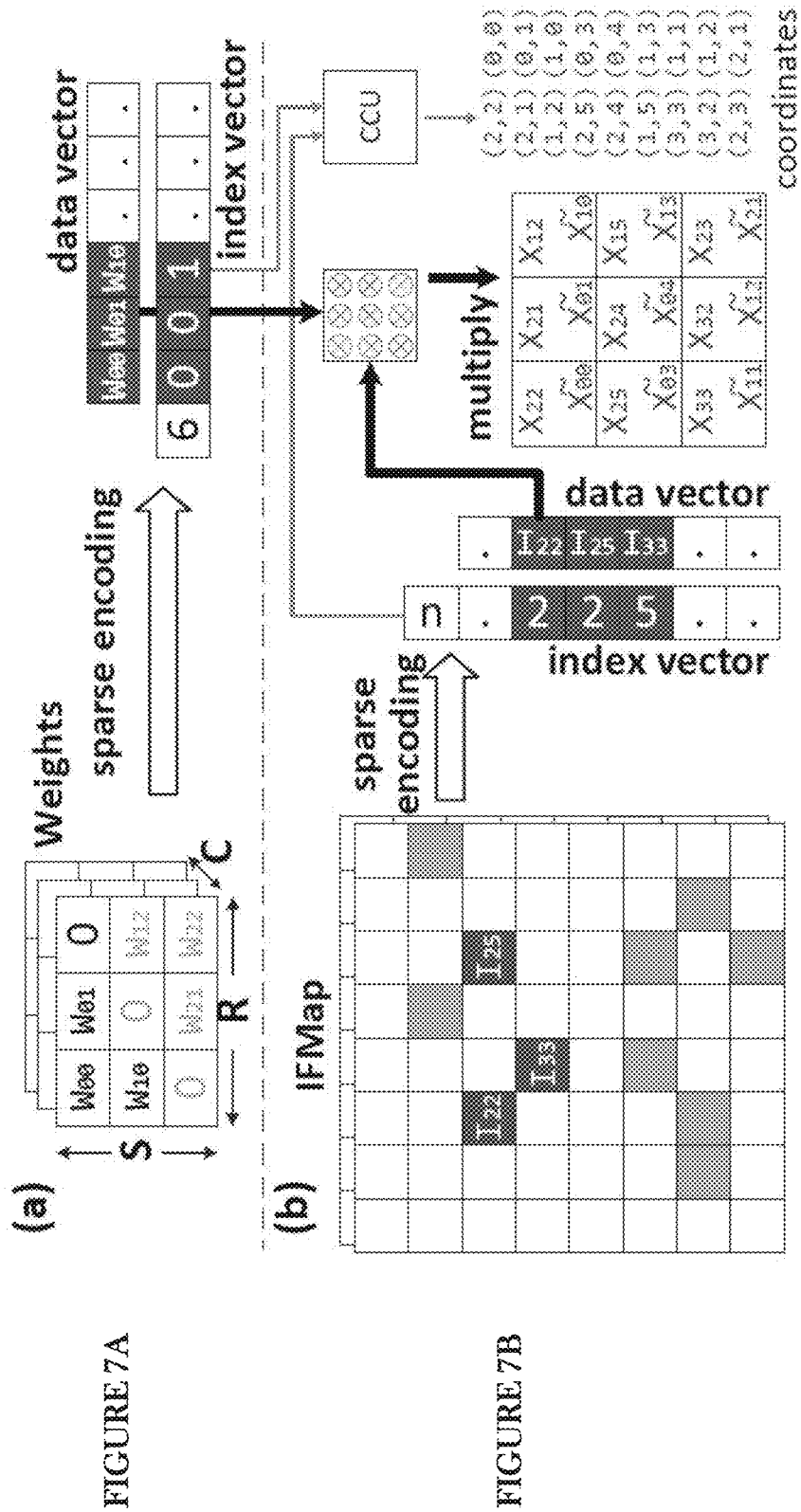
FIG. 7A is pseudocode of an exemplary CSCNN data flow, showing sparse encoding of weights.
FIG. 7B is pseudocode of an exemplary CSCNN data flow, showing duplication of multiplier outputs.
Figure 7C:
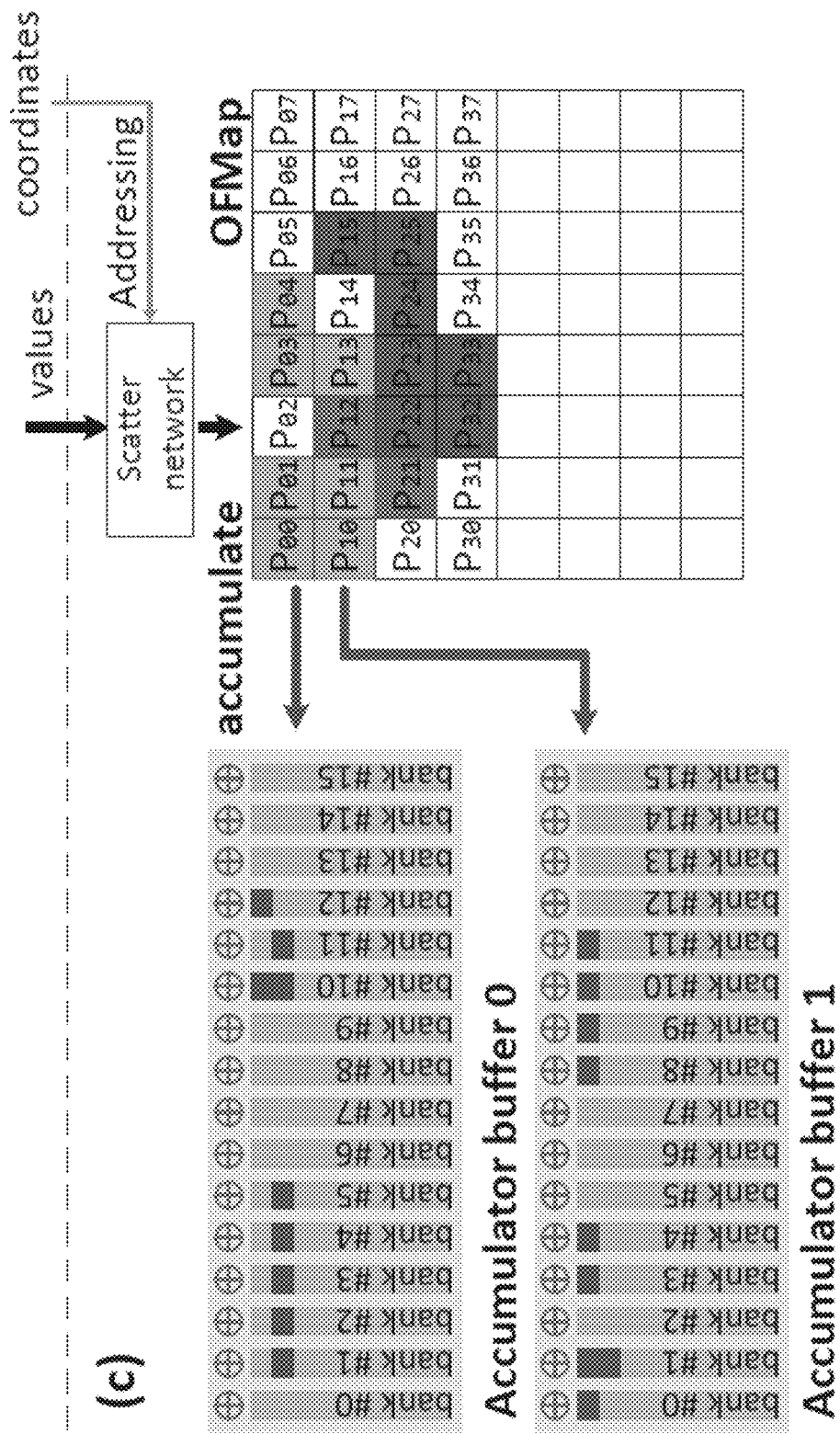
FIG. 7C is pseudocode of an exemplary CSCNN data flow, showing accumulation of multiplier outputs.

Multiplication reuse. As described in Equation (4), the multiplications in CSCNNs can be reused to reduce the overall operations. FIGS. 7B and 7C present an example of the multiplication reuse. When multiplying the weight $W_{00}$ (value: 1, C-S-R index: 0-0-0) with the input activation $I_{22}$, the multiplier outputs contribute to the corresponding partial sums ($P_{22}$), which is the same in baseline PEs. Because of the centrosymmetric structure, it is the same as the multiplication of the input activation with the dual weight $W_{22}$ (C-S-R index: 0-2-2), so the multiplier output also contribute to another partial sum $P_{00}$(marked red in FIG. 7C). Similarly, other multiplier outputs also contribute to another group of partial sums (marked red in FIG. 7C). Therefore, the CSCNN PE also sends the multiplier outputs (denoted as $X_{ij}$) to accumulator buffers for the additional accumulation. Notably, the CCU needs to compute the coordinates for the $X_{ij}$s.

If the dimension of the filters is odd numbers, the dual-weight of the central weight is itself. In this case, the CCU will generate nil coordinates for the multiplier output generated by central weights to not enable multiplication reuse.

If the multiplier outputs along with their duplicates are delivered to AB0 for accumulation of both partial sum groups (both blue and red elements in OFMap), it will cause buffer bank conflicts. In particular, because the number of partial sums waiting for accumulation equals the number of accumulator banks in AB0 (both are 2 $P_xP_y$), the multiplier outputs and their duplicates may hash to the same accumulator bank with a high probability. One solution is to double the number of banks in AB0. However, since the multiplier outputs are routed to the accumulator banks using a crossbar switch, doubling the number of banks will significantly increase the complexity of the scatter network. Scatter networks are a class of designed Convolutional Neural Networks (CNNs) with fixed weights. Therefore, instead of using one single accumulator buffer, we employ an additional and independent accumulator buffer to relieve the bank contention. However, there is a data hazard between the two accumulator buffers because they are operating on the same partial sums. Specifically, the overlapped partial sums of the blue and red elements in OFMap should be accumulated with two multiplier outputs. For example, both $X_{12}$ and $X_{12}$ should be accumulated to $P_{12}$. If not eliminating the data hazard, both accumulator buffers will access $O_{12}$ (original partial sum generated by other input channels) and perform accumulation. As a result, the original value of the partial sums is accumulated twice, causing wrong output results. To resolve data hazard, we delay the accumulation of $P_{12}$ and $P_{12}$ to $O_{12}$. Specifically, both accumulator buffers do not access the partial sums generated by other input channels. They accumulate the multiplier outputs to its local partial sums generated by input channels assigned to them. The results in AB0 and AB1 will be merged and accumulated with the partial sums generated by input channels in the PPU when they are flushed out from their accumulator buffers, respectively.

Computation order. We employ an input-stationary computation order in the multiplier array in which the input activations are held stationary as it is multiplied by all the non-zero weights in a single filter to make all of its contributions to the current OFMap. After finishing the computations in an IFMap related to the current OFMap, we hold the partial sums stationary in the accumulator buffers and move on to the next IFMap. This order minimizes the data movement of input activations inside a PE and minimized the data movement of output activations between PEs and global buffer.

Mixed Spatial Tiling

As described in FIG. 5, the CSCNN accelerator consists of multiple PEs connected to a shared global buffer (GLB). These PEs run in parallel to increase performance and capacity. There are multiple strategies to spread the work across the PE array. For example, SCNN employs planar tiling that partitions the activation plane (W×H dimension) into smaller planar tiles ($T_w \times T_h$) and distributes them to the PEs. However, the rigid planar tiling incurs two forms of inefficiency. One is intra-PE fragmentation when the layers do not have enough useful work to fully populate the multiplier array. Another is the inter-PE global barrier that leads to load imbalance among the Pes because PEs with denser workload would lag behind those with sparser workload. Specifically, using less but powerful PEs (each PE has a large multiplier array) can better alleviate the inter-PE global barrier but will exacerbate the intra-PE fragmentation problem, and vice versa. Besides, layers with small feature maps are more likely to suffer from intra-PE fragmentation problem, because the size of planar tiles would be very small in these layers, making it hard to fully populate the multiplier array.

In the CSCNN accelerator, we employ a mixed spatial tiling that combines local planar tiling and global output channel tiling to alleviate both forms of inefficiencies. The PE array is logically partitioned into smaller PE sub-arrays. For example, an 8×8 PE array can be partitioned into 4 PE sub-arrays, each containing 4×4 PEs. The output channel dimension is partitioned into $K/T_k$ channel groups of size TA that are distributed across the PE sub-arrays, resulting in a workload of size $T_k \times C \times W \times H \times R \times S$ for each PE sub-array to operate individually. Since all the input activations will be delivered to each PE sub-array, the load-balancing among PE sub-arrays depends solely on the density of the assigned filter groups (a TAx C×R×S volume of weights) for each PE sub-array. Because filters do not change during inference, we sort offline a layer's filters by density so that the filter groups for each PE sub-array are similar in density. The $T_k$ output channels for a PE sub-army is no longer assigned according to the channel id but the filter density. In doing so, the density of the workload $T_k \times C \times W \times H \times R \times S$ for each PE sub-array will be similar, removing the barrier among PE sub-arrays.

Furthermore, we employ planar tiling for the PEs inside a PE sub-array. The W× H activation plane is partitioned into smaller $T_w \times T_h$ planar tiles that are distributed across the PEs, resulting in an input activation volume of $T_k \times T_w \times T_h$ assigned to each PE. Because the PEs inside a PE sub-array share the same size of planar tiles and the same filter weights, they will finish their workload simultaneously, removing the barrier among PEs in a PE sub-array. Additionally, since the number of PEs in a PE sub-army is significantly reduced compared to the total number of PEs, the size of the planar tiles ($T_w$, $T_h$) could be larger so that each PE has a greater opportunity to fully utilize the multiplier array. Therefore, the intra-PE fragmentation problem is also significantly alleviated. Note that the partitioning of the input activation plane introduces data halos between adjacent PEs. The PE accommodates the output halos by exchanging incomplete partial sums with neighbors through the PPU. Similar to prior work, the tile size $T_k$, $T_w$, $T_h$ may change layer to layer to fully populate PEs and multiplier array. The detailed tiling factor setting mechanism is omitted for brevity.

In summary, rigid tiling strategies incur inefficiency because of the variance of the layers. By combining local planar tiling and global output channel tiling and change the tile size layer to layer, our strategy is adaptive for different layers and significantly alleviates the inefficiency incurred by rigid tiling strategies.

CSCNN Data Flow

FIG. 8 shows the pseudo-code for the complete CSCNN dataflow, which is summarized as follow:
1. Global output channel tiling: each PE sub-array produces Tk output channels (A).
2. Local planar tiling: each PE accommodates planar tiles (Tw×Th) of the input activation plane (B).
3. Removal of computations related to zero input activations and weights using Cartesian product based dataflow (C).
4. Enable the multiplication reuse introduced by centrosymmetric filters (D).

The Kcoord( ), Xcoord0( ), Xcoord1( ), Y coord0( ) and Y coord1( ) functions compute the k, x, and y coordinates of the uncompressed output activations using a de-linearization of the temporal loop indices a and w, the spatial loop indices Px and Py, and the known filter width and height. The dataflow doesn't show the DRAM memory accesses assuming that all the data resides in the on-chip global buffer. When the data exceeds the on-chip storage, the input and output channel dimension can be temporarily tiled so that the PEs operate on a portion of activations at a time, like other accelerator architectures. This temporal tiling may lead to frequent data transfer between on-chip and off-chip. Fortunately, researchers have extensively explored optimization techniques to reduce the off-chip memory accesses. Since these techniques are orthogonal to our on-chip dataflow, we omit the discussion for brevity.

Support for Fully-Connected Layers

In fully-connected (FC) layers, an individual weight is not mused across multiple input activations. Therefore, using Cartesian product-based dataflow would lead to significant performance loss for these layers. Although it would make the proposed accelerator unattractive for networks that are dominated by FC layers such as BERT, it is not a significant limitation as these layers are memory-hungry. To achieve optimal efficiency for both CONV and FC layers, we believe designers should consider using both CSCNN and an architecture optimized for FC layers (such as EIE).

Experimental Methodology

Simulator. The simulator is built based on the open-sourced TimeLoop simulator. We made customization to the simulator to support CSCNN dataflow. The simulator is combined with DRAMSim2 to evaluate the performance of the CSCNN accelerator. The simulator takes the weights and activations extracted from Pytorch as input and processes one layer at a time. It models the dataflow as well as the memory hierarchy and PE configurations, and collects the counts of arithmetic operations and memory accesses of different levels. The simulator estimates the compute time based on the number of arithmetic operations, while DRAMSim2 estimates the memory access latency. Then the results are combined to obtain overall execution time. Meanwhile, these statistical data are also used to build an energy model to estimate the energy consumption of the accelerator. For the energy model, energy numbers of arithmetic units and DRAM accesses are taken from Horowitz, while SRAM energies are taken from CACTI 6.0. Additionally, the simulator can be configured to act as accelerators with other dataflows. For example, the ineffective computations with zero operands still consume computing cycles to mimic the execution flow of dense accelerators.

RTL implementation. We implement CSCNN PE in RTL and synthesize it with Synopsys Design Vision using the 45 nm technology FreePDK45 library, assuming an 800 MHz clock. We use 16-bit fixed-point arithmetic units as it has been proved to be effective in CNN computation. We also implement the RTL of the SCNN PE (described in Section III-B1) to evaluate the overhead of the CSCNN accelerator, and the RTL of the major components in SparTen to compare the area efficiency.

Baselines. We compare our design with a dense CNN accelerator (DCNN) and seven sparse CNN accelerators: Cnvlutin, Cambricon-X, SCNN, SparTen, CGNet, Cambricon-S, CirCNN. The characteristics of the CNN accelerators are listed in Table IV. The DCNN accelerator adopts the PE architecture described in Du et al. We mimic their dataflow in our simulator taking their design details as input, including partitioning, sparsity support, data reuse pattern, and load-balancing mechanisms. We profile their arithmetic operation and memory accesses and use these statistics to estimate their energy consumption. SpafTen employs an offline software scheme called greedy balancing which groups filters by density to balance the workload among the PEs. Since this software technique doesn't require hardware modifications, we also apply this technique to other accelerators to provide a fair comparison. Since GEMM accelerators have shown promising results on accelerating deep learning workloads, we also compare the proposed accelerator against two GEMM accelerators: SIGMA and SpArch. They are also scaled to be equipped with the same number of multipliers. Because SIGMA/SpArch are specialized for GEMMs rather than CNNs, we remap the convolution operation into a GEMM via the Im2Col operation. Note that the experimental results will not include CGNet and CirCNN because: 1) the layer-wise characteristic of CGNet is not available since it's not described in the original paper; 2) CirCNN transforms convolution to FFT computation and utilizes FFT-based multi-plications whose computing block is completely different from that of other accelerators. Our simulator currently does not support cycle-level simulations for CirCNN.

TABLE IV

COMPARISON OF THE CNN ACCELERATORS.

| Accelerators | Compression | Sparsity | Inner spatial dataflow |
|---|---|---|---|
| DCNN | — | — | Matrix-scalar product |
| Cnvlutin | Deep compression | A | Vector-scalar product |
| Cambricon-X | Deep compression | W | Vector dot product |
| SCNN | Deep compression | A + W | Cartesian product |
| SparTen | Deep compression | A + W | Vector dot product |
| Cambricon-S | Coarse-grained pruning | A + W | Vector dot product |
| CGNet | Fine-grained channel gating | A | Vector dot product |
| CirCNN | Block-circulant matrices | W | FFT |
| CSCNN | Centrosymmetric filters | A + W | Cartesian product |

Architectural configuration. The CSCNN accelerator is equipped with a 2×2 PE array, with each PE containing an 4×4 multiplier array. In each PE, the input and output buffer size is 40 KB in total. The weight buffer size is 10 KB for CSCNN PE, while 16 KB for SCNN PE. CSCNNPE uses smaller weight buffer because the centrosymmetric structure of filters can reduce the storage requirements of weights. The accumulator buffer in CSCNN PE is 12 KB, while in SCNN PE is 6 KB. The SCNN PE is equipped with a scatter crossbar of 16×32, while CSCNN PE employs two such scatter crossbars since it has an additional accumulator buffer. All the baseline accelerators are also equipped with the same number of multipliers so that we can compare the performance with almost identical computational resources. Additionally, the working frequency of the CSCNN accelerator and the baselines are kept the same at 800 MHz.

Benchmarks. We use the CNN models listed in Table II and Table III as the benchmarks to evaluate these accelerators, including ConvNet for Cifar10, AlexNet, VGG16, ResNet18/ResNet50/ResNet152, ShuffleNet-V2, and CSCNN models while the other accelerators except Cambricon-S run the model pruned by Deep compression. Since the CNN models for Cambricon-S is not open-sourced, we use the model characteristics described in their original papers to build the models with similar sparsity. The CSCNN models are extracted from Pytorch after applying our compression method. The CNN models for deep compression is obtained from Github.

Experimental Results

Hardware Characteristics

Table V presents the area of the major components in SCNN and CSCNN PE. Area numbers for the logic components, e.g., MulArray and PPU, are obtained from synthesis, while the area for the buffers is obtained using CACTI 6.0. Under the same computing resources, CSCNN PE increases the total area by 17.7% over SCNN, with 1.26 $mm^2$ vs. 1.07 $mm^2$. The main area overhead of CSCNN PE stems from the additional Accumulator buffer and the scatter network, which consumes an extra area of 0.13 $mm^2$ and 0.11 $mm^2$, respectively. In both PEs, the memories (IB, WB, OB, AB) contribute more than 65% of the PE area, while the multiplier array consumes no more than 5%. Although the size of AB is small, it consumes 21.43% of the CSCNN PE area because it's heavily banked for the parallel accumulation. In summary, CSCNN PE only incurs a moderate area overhead in exchange for a more efficient multiplication reuse.

TABLE V

AREA ANALYSIS OF SCNN AND CSCNN PEs.

| | SCNN PE | | CSCNN PE | |
|---|---|---|---|---|
| | Capacity | Area($mm^2$) | Capacity | Area($mm^2$) |
| Total | — | 1.07 (100%) | — | 1.26 (100%) |
| MulArray | 16 | 0.05 (4.20%) | 16 | 0.05 (3.57%) |
| IB + OB | 40 KB | 0.41 (38.66%) | 40 KB | 0.41 (32.86%) |
| WB | 16 KB | 0.22 (20.17%) | 10 KB | 0.14 (11.43%) |
| AB | 6 KB | 0.14 (12.61%) | 12 KB | 0.27 (21.43%) |
| Scatter Network | 16 × 32 crossbar | 0.11 (10.08%) | 16 × 32 crossbar × 2 | 0.22 (17.14%) |
| CCU | — | 0.03 (2.52%) | — | 0.05 (3.57%) |
| PPU | — | 0.13 (11.76%) | — | 0.13 (10.00%) |

Performance

Figure 9:
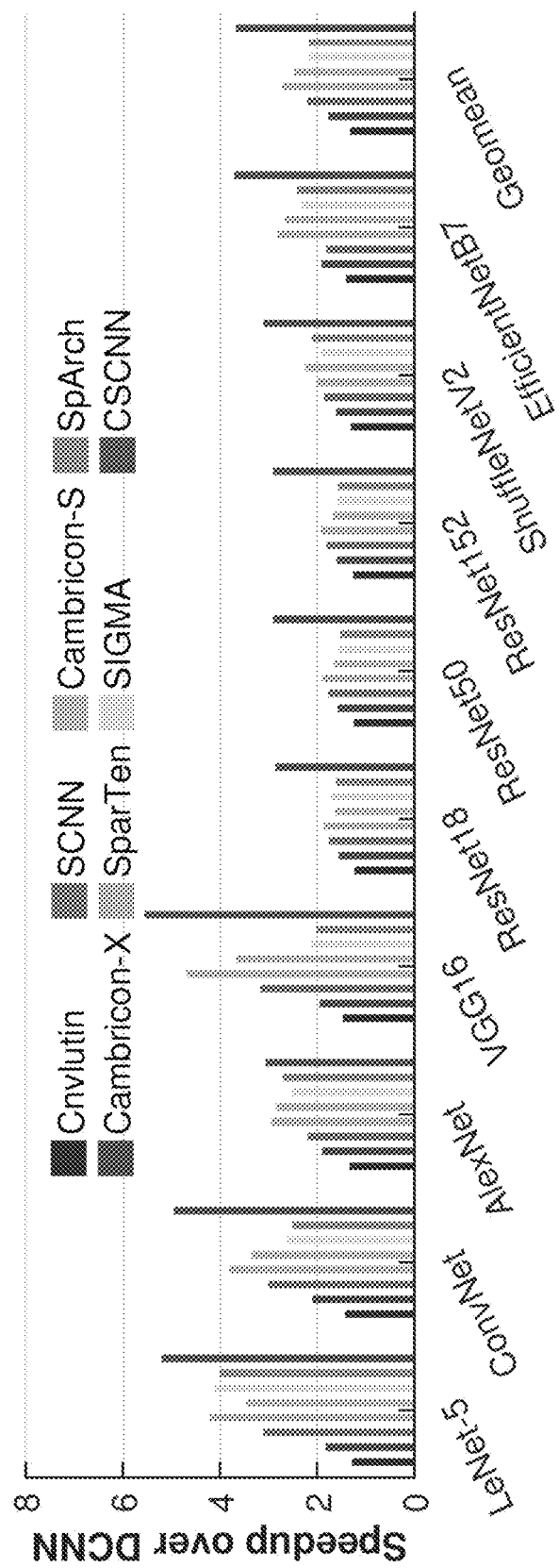
FIG. 9 is a diagram showing speedup over a DCNN accelerator.
Figure 10A:
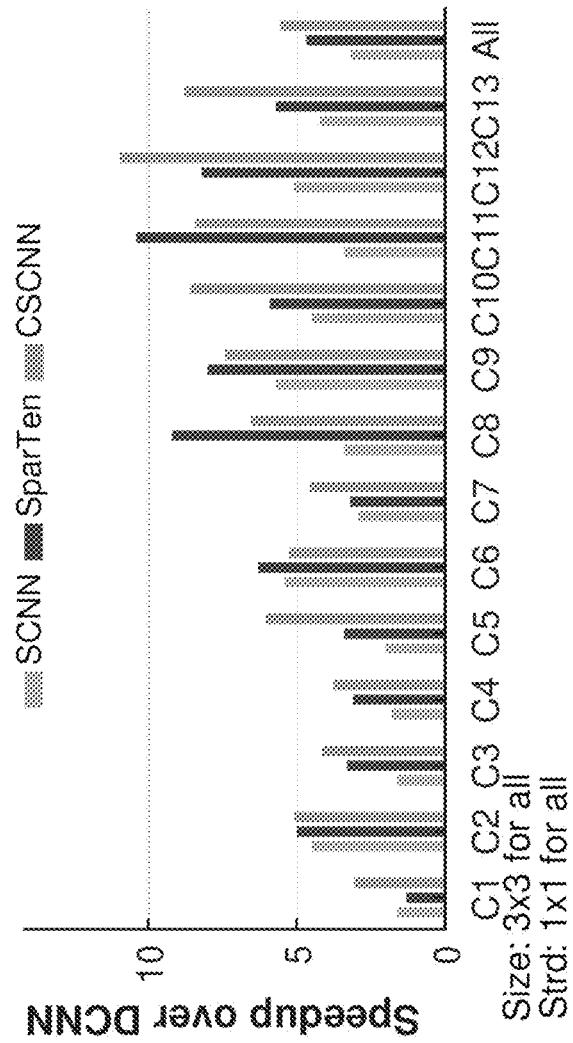
FIGS. 10A-10B are diagrams showing layer-wise speedup over a DCNN accelerator.
Figure 10B:
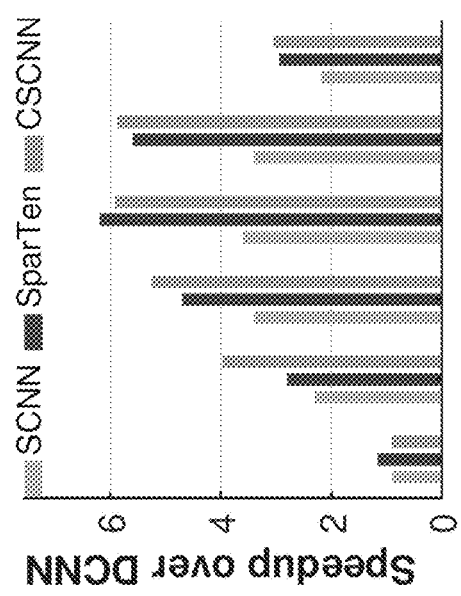

We first compare the performance of the proposed accelerator with the dense and sparse accelerators. FIGS. 9 and 10A-10B summarize the speedups delivered by these accelerators over DCNN. Overall, the CSCNN accelerator consistently outperforms the baselines and achieves an average speedup of 3.7×, 2.8×, 2.1×, 1.6×, 1.3×, 1.5×, 1.6×, 1.6×over DCNN, Cnvlutin, Cambricon-X, SCNN, SparTen, Cambricon-S, SIGMA and SpArch, respectively. In the following texts, "CSCNN" refers to the CSCNN accelerator for brevity, unless otherwise specified. The performance improvement of CSCNN varies across the neural networks. Specifically, CSCNN improves the performance by 2.9-5.5 over DCNN, 2.3-4.1×over Cnvlutin, 1.6-2.9×over Cambricon-X, 1.4-2.0× over SCNN, 1.0-1.6×over SparTen, 1.1-1.8×over Cambricon-S, 1.2-2.6×over SIGMA, and 1.1-2.7×over SpArch.

CSCNN outperforms them because 1) CSCNN supports two-sided sparsity; and 2) our compression technique removes more computations by enabling computational reuse. The performance of Cambricon-X and Cnvlutin are left behind because they only exploit one-sided sparsity, i.e., Cambricon-X for weight sparsity while Cnvlutin for activation sparsity. Although SCNN exploits two-sided sparsity, its performance benefit is hindered by its overheads, including both intra-PE fragmentation and inter-PE global barrier as described below. Moreover, SCNN cannot support the multiplication reuse. Cambricon-S and SparTen are two state-of-the-art accelerators that address the irregularity problem in sparse CNNs. Cambricon-S employs a coarse-grained pruning technique to reduce irregularity and exploits both activation and weight sparsity to further reduce computations. SparTen employs auxiliary hardware modules for load balancing and sparse index computation, alleviating the problems incurred by SCNN. Because the remaining MACs of Deep compression is less than the pruning technique used in Cambricon-S, SparTen performs 1.17× better on average than Cambricon-S. Even so, CSCNN still outperforms SparTen due to the superior reduction on computation. Since SIGMA and SpArch are specialized for GEMMs rather than CNNs, they cannot efficiently exploit the parallelism and data locality that are available in CNNs. They have to transform convolutions to GEMMs via reordering operations, which drastically increases the storage requirements and memory traffic thereby negatively affecting their efficiency of processing CNNs.

The performance results are better understood by looking at the layer-wise performance of SCNN, SparTen, and CSCNN on AlexNet and VGG16 in FIGS. 10A-10B. For C1 in AlexNet, because the input activations and weights are very dense (more than 80% density), SCNN and CSCNN are left behind because their Cartesian product based dataflow introduces unnecessary computations since the stride in C1 is larger than one. For C2, CSCNN significantly outperforms SCNN and SparTen in C2 because the density of activations and weights are moderate, whereas computational reuse contributes about 2× to the performance gains of CSCNN. For the top layers where activations and weights are both very sparse (rightmost layers), CSCNN performs comparably with SparTen but much better than SCNN. VGG16 also follows the same trend.

Energy Consumption

Figure 11:
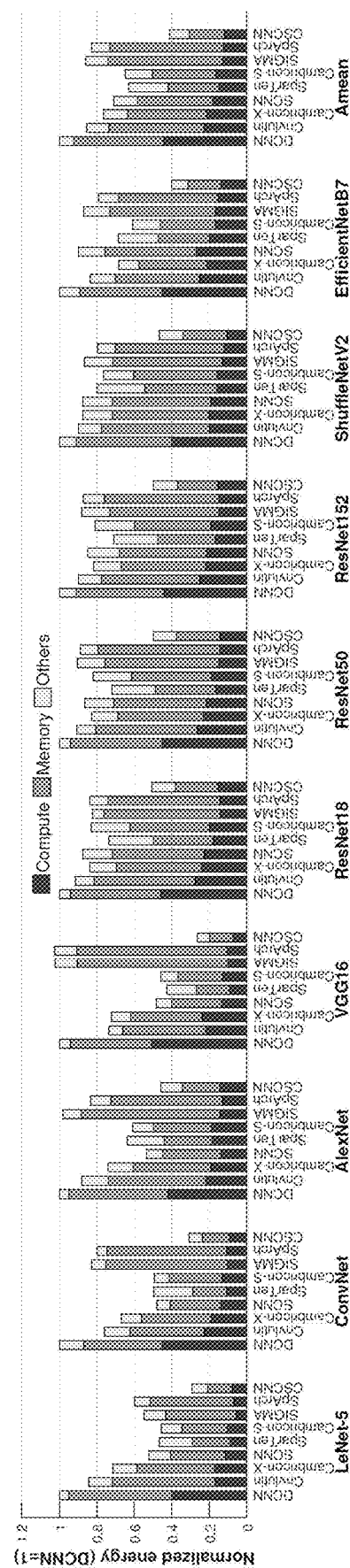
FIG. 11 is a diagram showing energy consumption of accelerators for various CNN architectures.
Figure 12:
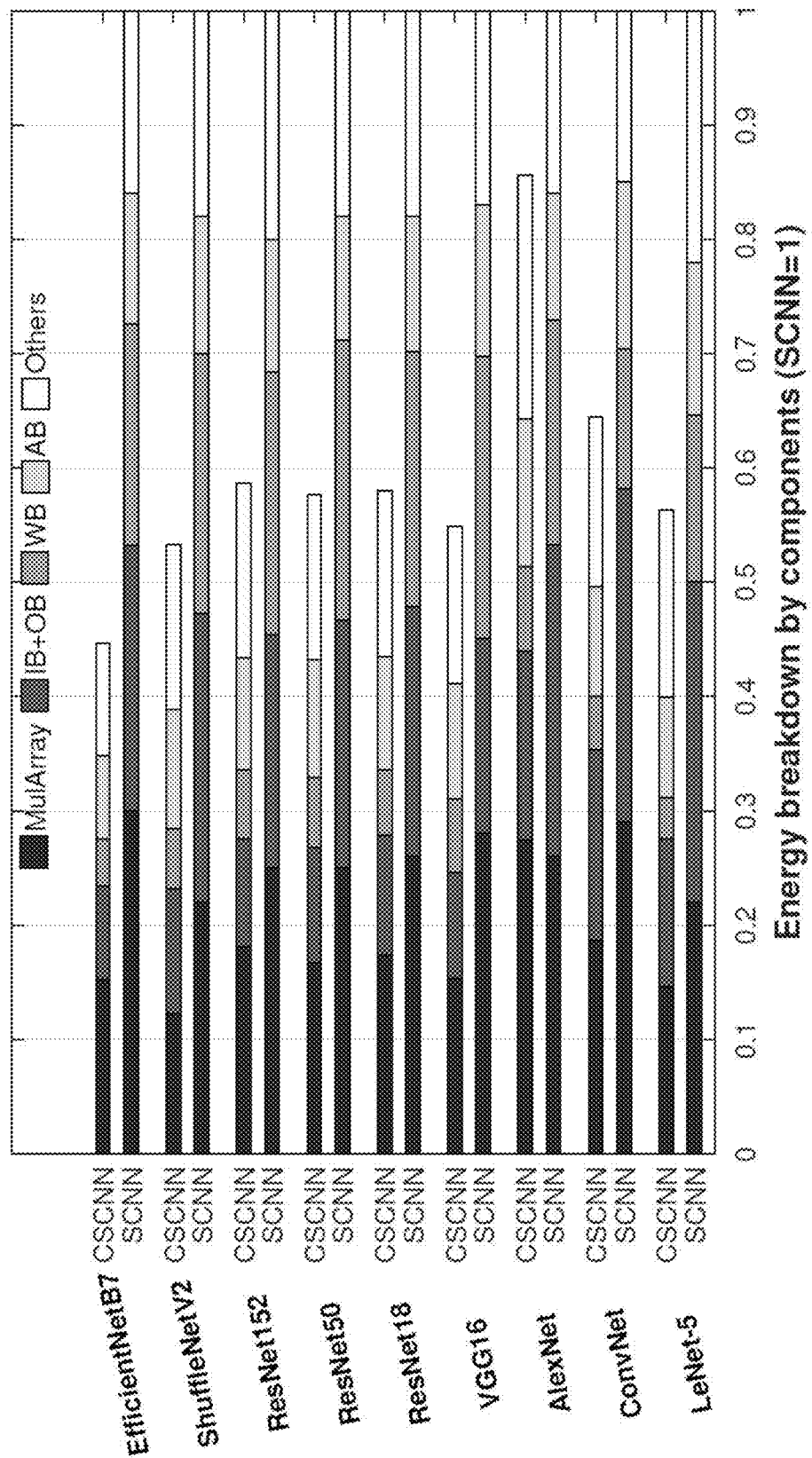
FIG. 12 is a diagram showing the energy breakdown by components in the DCNN and CSCNN accelerators.

In FIG. 12, we report the energy comparison of the architectures which has been normalized to the energy of DCNN. It should be noted that the energy consumption shown in FIG. 11 does not include main memory accesses which usually dominates the total energy consumption. On average, CSCNN improves energy efficiency by 2.4×, 2.1×, 1.9×, 1.7×, 1.5×, 1.6×, 2.1×, and 2.0× over the baseline accelerators, respectively. The improvement of energy efficiency varies widely across the models depending on the sparsity and the structure of the networks. We separate the energy into three parts: 1) compute includes energies from arithmetic operations; 2) memory includes the on-chip memory access energies; and 3) others contains the rest energies from control and auxiliary modules for each accelerator. All sparse accelerators significantly reduce compute energy since they eliminate computations related to zeros. Although they also save energy by eliminating the on-chip memory accesses of zeros, the benefit is weakened by the memory accesses of indices, which stores the locations of non-zeros. Because the dual-weights in CSCNN models don't need to be indexed, the energy consumption of CSCNN on index storage and accessing is less than other accelerators. SIGMA and SpArch consume 2.5× more energy on memory accesses than CSCNN because the transformation from convolutions to GEMMs increases the storage requirements and memory traffic.

We further show the energy breakdown by components of the SCNN and CSCNN accelerators. The energy consumption of the multiplier array in CSCNN reduces by a factor of 1.5× on average compared to SCNN. The IB+OB and WB in CSCNN consume 1.9× and 3.4×less energy respectively, which benefits from the reduction of weights. The energy benefits of AB in CSCNN is hindered by the additional accumulator buffer, achieving a reduction of 1.3× on average compared to SCNN.

Impact of Mixed Spatial Tiling

Figure 13A:
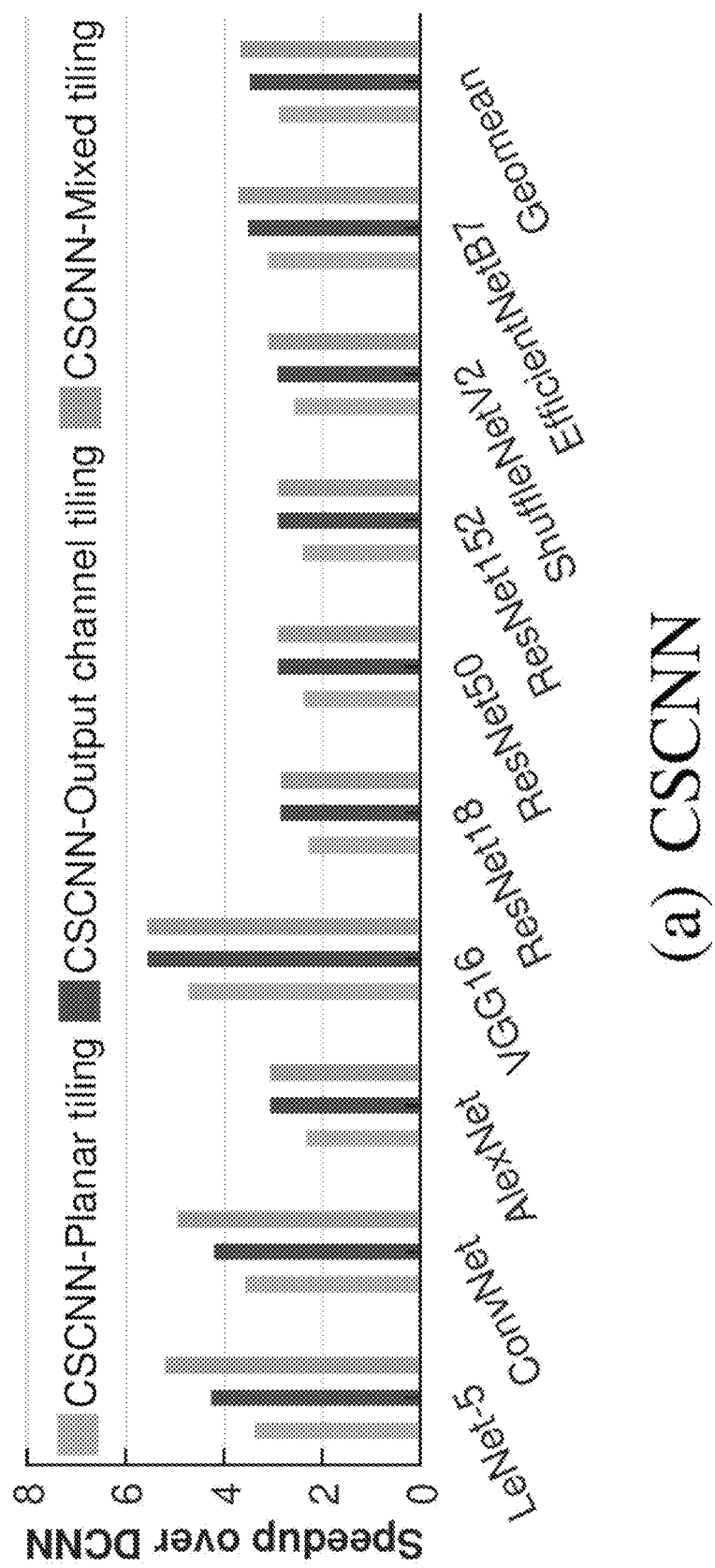
FIGS. 13A-13C are a diagram showing the impact of different tiling strategies.
Figure 13B:
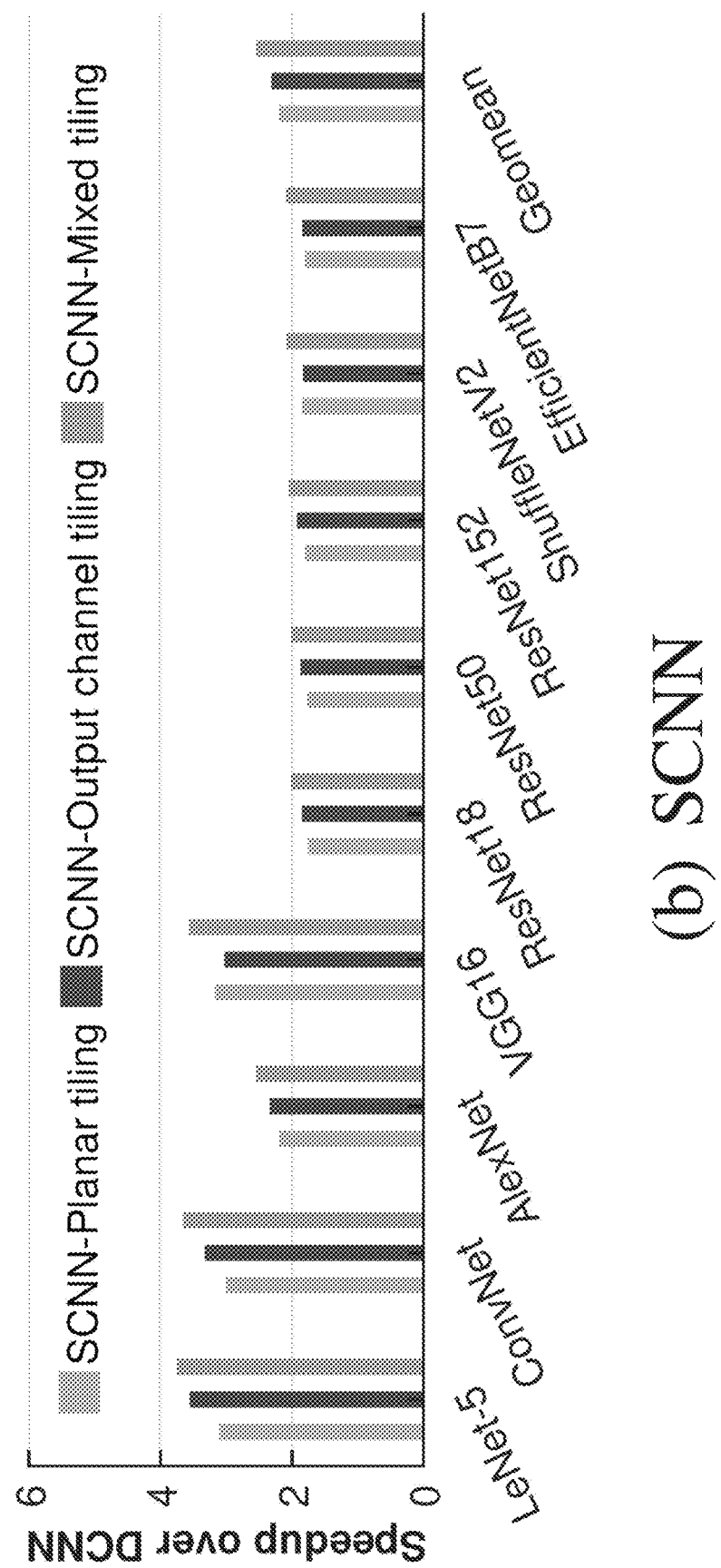
Figure 13C:
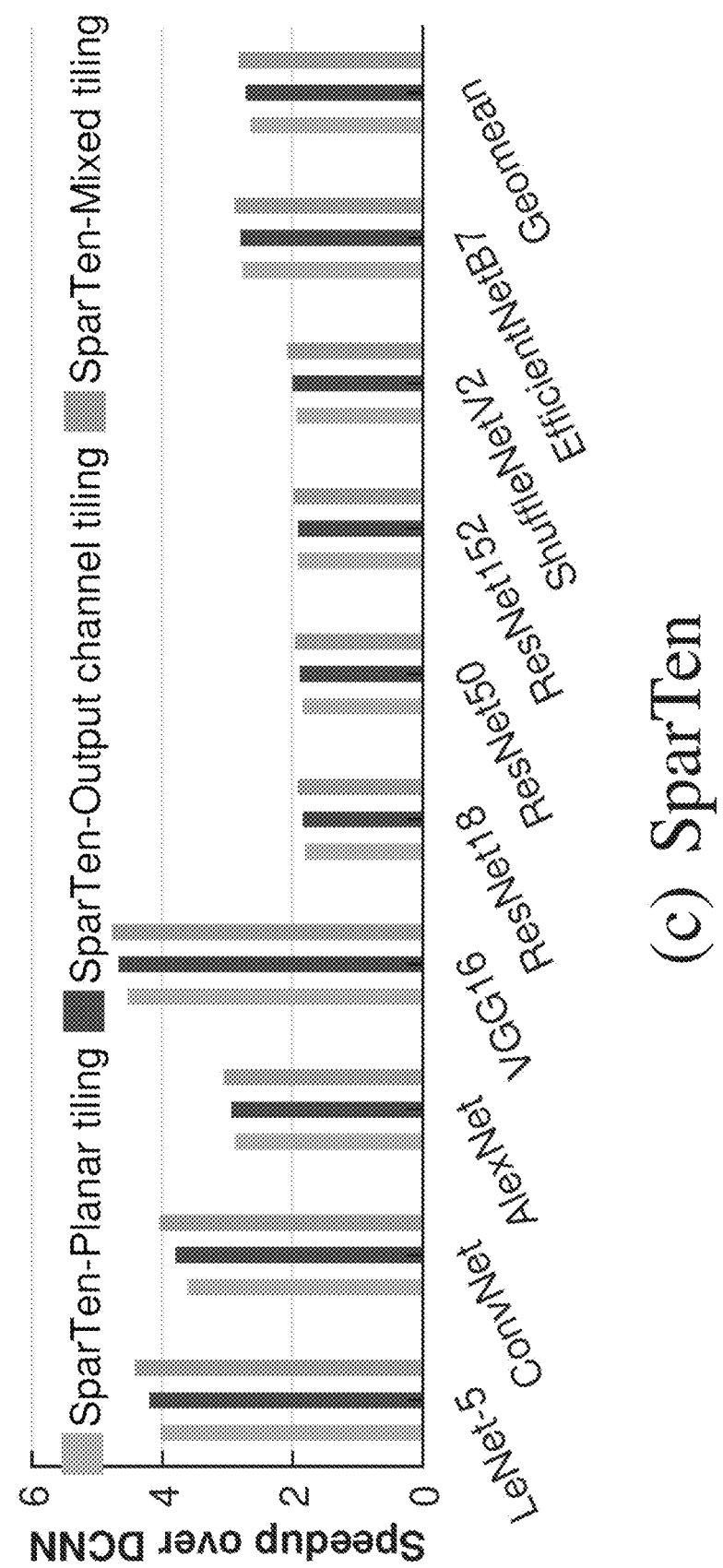

The PE tiling strategies affect intra-PE fragmentation and inter-PE barrier, two important factors for performance. We evaluate the impact of our mixed tiling strategy by comparing it with two rigid strategies: planar tiling only (used in SCNN) and output channel tiling. FIGS. 13A-13C show the performance of CSCNN using the three tiling strategies. The mixed tiling improves performance by 1.28× and 1.07× over planar tiling and output channel tiling. The output channel tiling performs as good as mixed tiling on AlexNet and VGG16, but incurs performance loss on LeNet-5 and ConvNet because the latter two don't have sufficient output channels to feed the PEs, causing PE under-utilization. We also apply the mixed spatial tiling to SCNN and SparTen to investigate if they could benefit from such tiling optimization, as shown in FIGS. 13B and 13C. We observed that SparTen benefits only marginally from the tiling optimizations, as SparTen already employs a hardware/software balancing mechanism to balance the workload for the PEs, which attempts to solve the same problem as tiling optimizations. SCNN gains 1.2× speedup from the tiling optimizations over its original tiling strategy. CSCNN still performs 1.4× better than SCNN without tiling optimizations.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A centrosymmetric convolutional neural network computer system comprising:
   an input activation position buffer,
   an input activation value buffer,
   a weight value buffer;
   a weight position buffer;
   a multiplier array that receives a first vector from the input activation value buffer and a second vector from the weight value buffer and calculates a third vector of products; and
   a coordinate computation unit that:
      receives first associated positions of the first vector from the input activation position buffer and second associated positions of the second vector from the weight position buffer,
      calculates a fourth vector of associated positions;
      transforms the second associated positions into third associated positions, wherein the third associated positions are centrosymmetric;
      combines the second associated positions and the third associated positions into a fifth vector of associated positions.

2. The convolutional neural network computer system of claim 1, wherein the third vector is stored at a first accumulator buffer and a second accumulator buffer.

3. The convolutional neural network computer system of claim 2, wherein the third vector is stored at an associated position in the fourth vector of associated positions at the first accumulator buffer.

4. The convolutional neural network computer system of claim 2, wherein the third vector is stored at an associated position in the fifth vector of associated positions at the second accumulator buffer.

5. The convolutional neural network computer system of claim 1, wherein the multiplier array performs a full Cartesian product of the first vector and the second vector to generate multiplier outputs.

6. The convolutional neural network computer system of claim 5, wherein the multiplier outputs are routed to an accumulator bank using a crossbar switch.

7. The convolutional neural network computer system of claim 1, wherein the first vector and the second vector are non-zero values.

8. The convolutional neural network computer system of claim 1, wherein the multiplier array uses input-stationary computation order.

9. A computer-implemented method of operating a centrosymmetric convolutional neural network comprising:
  receiving a first vector from an input activation value buffer and a second vector from a weight value buffer at a multiplier array;
  calculating a third vector of products at the multiplier array;
  receiving first associated positions of the first vector from the input activation position buffer and second associated positions of the second vector from a weight position buffer at a coordinate computation unit;
  calculating a fourth vector of associated positions at the coordinate computation unit;
  transforming the second associated positions into third associated positions at the coordinate computation unit, wherein the third associated positions are centrosymmetric; and
  combining the second associated positions and the third associated positions into a fifth vector of associated positions at the coordinate computation unit.

10. The computer-implemented method of claim 9, wherein the third vector is stored at a first accumulator buffer and a second accumulator buffer.

11. The computer-implemented method of claim 10, wherein the third vector is stored at an associated position in the fourth vector of associated positions at the first accumulator buffer.

12. The computer-implemented method of claim 11, wherein the third vector is stored at an associated position in the fifth vector of associated positions at the second accumulator buffer.

13. The computer-implemented method of claim 9, further comprising performing a full Cartesian product of the first vector and the second vector to generate multiplier outputs at the multiplier array.

14. The computer-implemented method of claim 13, wherein the multiplier outputs are routed to an accumulator bank using a crossbar switch.

15. The computer-implemented method of claim 9, wherein the first vector and the second vector are non-zero values.

16. The computer-implemented method of claim 9, wherein the multiplier array uses input-stationary computation order.

* * * * *